(12) United States Patent
Matsuumi et al.

(10) Patent No.: US 7,273,641 B2
(45) Date of Patent: Sep. 25, 2007

(54) OPTICALLY ANISOTROPIC ELEMENT COMPRISING DISCOTIC COMPOUND

(75) Inventors: Michitaka Matsuumi, Kanagawa (JP); Shigeki Uehira, Kanagawa (JP); Atsuhiro Ohkawa, Kanagawa (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 172 days.

(21) Appl. No.: 11/061,543

(22) Filed: Feb. 18, 2005

(65) Prior Publication Data

US 2005/0181144 A1    Aug. 18, 2005

(30) Foreign Application Priority Data

Feb. 18, 2004 (JP) .............................. 2004-041577
May 28, 2004 (JP) .............................. 2004-159437

(51) Int. Cl.
C09K 19/32 (2006.01)
C09K 19/38 (2006.01)
C07C 69/76 (2006.01)
C07C 69/753 (2006.01)

(52) U.S. Cl. ................. 428/1.1; 252/299.62; 560/80; 560/85; 560/128; 560/181

(58) Field of Classification Search .............. 428/1.1; 252/299.62; 560/80, 85, 128, 181
See application file for complete search history.

(56) References Cited

U.S. PATENT DOCUMENTS 5,635,105 A * 6/1997 Kawata et al. ......... 252/299.01
5,730,900 A * 3/1998 Kawata ................. 252/299.01

* cited by examiner

*Primary Examiner*—Shean C Wu
(74) *Attorney, Agent, or Firm*—Buchanan Ingersoll & Rooney PC

(57) ABSTRACT

An optically anisotropic element comprises a discotic compound. The discotic compound has an oriented discotic plane. The discotic compound has a molecular structure represented by the formula (I) of $D(-O-CO-CR^1=CR^2-X-R^3)_n$. In the formula (I), D is a discotic core, n is an integer of 3 to 20, each of $R^1$ and $R^2$ is hydrogen, a halogen atom or an alkyl group, X is $-O-$, $-S-$ or $-NR-$, and $R^3$ is an alkyl group or an aryl group. A polymerizable discotic compound having an oriented discotic plane can be polymerized to form an optically anisotropic element. Alignment of the oriented discotic plane is fixed by polymerization. A new discotic compound is also disclosed.

17 Claims, No Drawings

OPTICALLY ANISOTROPIC ELEMENT COMPRISING DISCOTIC COMPOUND

FIELD OF THE INVENTION

The present invention relates to an optically anisotropic element prepared from a discotic compound whose molecular structure is composed of an ester of discotic core and unsaturated carboxylic acid moieties.

BACKGROUND OF THE INVENTION

Japanese Patent Provisional Publication Nos. 8(1996)-50206, 7(1995)-306317 and 9(1997)-104866 propose an optical compensatory sheet comprising an optically anisotropic layer formed from a discotic liquid crystal compound, which can be used to enlarge a viewing angle of a liquid crystal display. Publication Nos. 7(1995)-306317 and 9(1997)-104866 further disclose 2,3,6,7,10,11-hexa{4-(6-acryloyloxyhexyloxy)benzoyloxy}triphenylene as a discotic liquid crystal compound suitable for forming an optically anisotropic layer of optical compensatory sheet.

The retardation (Δnd) of the optical compensatory sheet is designed according to optical characters of the liquid crystal cell to be compensated. The value of retardation (Δnd) is a product of birefringent anisotropy (Δn) and thickness (d) of the optically anisotropic layer. Even if the thickness (d) is small, an optically anisotropic layer having sufficient birefringent anisotropy (Δn) can compensate the liquid crystal cell. However, it is very difficult to prepare the optically anisotropic layer having sufficient birefringent anisotropy (Δn) from known discotic liquid crystal compounds, for example, those disclosed in Japanese Patent Provisional Publication Nos. 7(1995)-306317 and 9(1997)-104866.

Japanese Patent Provisional Publication No. 2001-166147 discloses a discotic liquid crystal compound having large birefringent anisotropy. However, the disclosed compound has a poor optical character on wavelength dispersion. In other words, the compound enlarges the wavelength dispersion. The resultant optical compensatory sheet causes an unfavorable chromaticity change in a displayed color image.

Generally, the character on wavelength dispersion inversely relates to birefringent anisotropy. In other words, the more the birefringent anisotropy is increased, the more the wavelength dispersion is usually impaired. It has been desired to develop a discotic liquid crystal compound having large birefringent anisotropy but giving small wavelength dispersion.

It is known that phases formed by discotic liquid crystal compounds are roughly categorized into three phases, namely, a columnar phase, a discotic nematic ($N_D$) phase, and a chiral discotic nematic phase. In the columnar phase, central cores of the discotic molecules are piled up in the form of columns through intermolecular force. In the discotic nematic phase, the discotic molecules aggregate randomly. W. H. de Jeu (Physical properties of liquid crystalline materials, Gordon and Breach Science Publishers, 1980) reports that the discotic nematic phase is seldom observed while the columnar phase is often observed. In addition, the discotic nematic phase of triphenylene compound has been observed only in the case that the triphenylene compound has benzoyloxy or cinnamoyl substituent groups at 2, 3, 6, 7, 10 and 11-positions.

Journal of Materials Chemistry vol. 12, pp. 553 (2002) discloses a compound having a side chain of vinyl ether. However, the disclosed compound is a rod-like liquid crystal compound. Further, the publication is silent about its application to, for example, optical films.

SUMMERY OF THE INVENTION

It is an object of the present invention to provide an optically anisotropic element advantageously used as a phase retarder.

It is another of the present invention to provide an optically anisotropic element excellent in both the birefringent anisotropy and the character on wavelength dispersion.

It is a further object of the invention to provide an optically anisotropic element enough advantageously used in an optical compensatory sheet for liquid crystal display to enlarge the viewing angle and to prevent a displayed image from changing chromaticity unfavorably.

The present invention provides the optically anisotropic elements (1) to (16) and the triphenylene compounds (17) to (19), described below.

(1) An optically anisotropic element comprising a discotic compound represented by the following formula (I), wherein the discotic compound has an oriented discotic plane:

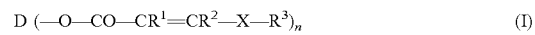

$$D\ (\text{—O—CO—}CR^1\!\!=\!\!CR^2\text{—X—}R^3)_n \qquad (I)$$

in which D is a discotic core; n is an integer of 3 to 20; each of $R^1$ and $R^2$ is independently hydrogen, a halogen atom, an alkyl group or a substituted alkyl group, or otherwise $R^1$ and $R^2$ are combined to form an aliphatic ring; X is —O—, —S— or —NR— where R is hydrogen or an alkyl group; and $R^3$ is an alkyl group, a substituted alkyl group, an aryl group or a substituted aryl group.

(2) The optically anisotropic element of (1), wherein D in the formula (I) is triphenylene.

(3) The optically anisotropic element of (1), wherein n in the formula (I) is 6.

(4) The optically anisotropic element of (1), wherein each of $R^1$ and $R^2$ in the formula (I) is independently hydrogen or methyl.

(5) The optically anisotropic element of (1), wherein X in the formula (I) is —O— or —S—.

(6) The optically anisotropic element of (1), wherein $R^3$ in the formula (I) is a substituted alkyl group or a substituted aryl group, and has a substituent group in which a polymerizable group is positioned at the terminal.

(7) The optically anisotropic element of (1), wherein the discotic compound represented by the formula (I) is a discotic liquid crystal.

(8) The optically anisotropic element of (1), wherein the discotic compound forms a discotic nematic phase.

(9) An optically anisotropic element formed by polymerizing a polymerizable discotic compound represented by the following formula (II), wherein the discotic compound has an oriented discotic plane, alignment of said oriented discotic plane being fixed by polymerization:

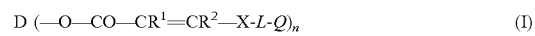

$$D\ (\text{—O—CO—}CR^1\!\!=\!\!CR^2\text{—X-}L\text{-}Q)_n \qquad (I)$$

in which D is a discotic core; n is an integer of 3 to 20; each of $R^1$ and $R^2$ is independently hydrogen, a halogen atom, an alkyl group or a substituted alkyl group, or otherwise $R^1$ and $R^2$ are combined to form an aliphatic ring; X is —O—, —S— or —NR— where R is hydrogen or an alkyl group; L is an alkylene group, a substituted alkylene group, an arylene group, a substituted arylene group or a divalent linking group consisting of a combination of an alkylene group, a substituted alkylene group, an arylene group or a substituted arylene group with —O— or —CO—; and Q is a polymerizable group.

(10) The optically anisotropic element of (9), wherein D in the formula (II) is triphenylene.

(11) The optically anisotropic element of (9), wherein n in the formula (II) is 6.

(12) The optically anisotropic element of (9), wherein each of $R^1$ and $R^2$ in the formula (II) is independently hydrogen or methyl.

(13) The optically anisotropic element of (9), wherein X in the formula (II) is —O— or —S—.

(14) The optically anisotropic element of (9), wherein Q in the formula (II) is an epoxy group or an ethylenically unsaturated group.

(15) The optically anisotropic element of (9), wherein the discotic compound represented by the formula (I) is a discotic liquid crystal.

(16) The optically anisotropic element of (9), wherein the discotic compound forms a discotic nematic phase.

(17) A discotic compound represented by the following formula (I):

D (—O—CO—CR$^1$═CR$^2$—X—R$^3$)$_n$    (I)

in which D is a discotic core; n is an integer of 3 to 20; each of $R^1$ and $R^2$ is independently hydrogen, a halogen atom, an alkyl group or a substituted alkyl group, or otherwise $R^1$ and $R^2$ are combined to form an aliphatic ring; X is —O—, —S— or —NR— where R is hydrogen or an alkyl group; and $R^3$ is an alkyl group, a substituted alkyl group, an aryl group or a substituted aryl group.

(18) The discotic compound of (17), wherein D in the formula (I) is triphenylene.

(19) The discotic compound of (17), which is a discotic liquid crystal.

The optically anisotropic element according to the invention is useful as an optically anisotropic layer. The discotic compound defined by the formula (I) behaves as liquid crystal either singly or in the presence of other additives. The molecules of the discotic compound can be so aligned that the formed optically anisotropic layer has large birefringent anisotropy but gives small wavelength dispersion. This means, if equipped with a phase retarder comprising the discotic compound of the formula (I), a liquid crystal display gives an image less suffering unfavorable chromaticity-change and has an enlarged viewing angle. Further, even if thin, the optically anisotropic layer formed from the discotic compound of the formula (I) can be made to have enough retardation to produce a thin liquid crystal display.

DETAILED DESCRIPTION OF THE INVENTION

[Discotic Compound]

In the present invention, a discotic compound represented by the following formula (I) is used.

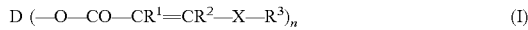

D (—O—CO—CR$^1$═CR$^2$—X—R$^3$)$_n$    (I)

In the formula (I), D is a discotic core. The discotic core is positioned at the center of the molecular structure, and is a part serving as the discotic plane of discotic molecule. The discotic core is a well-known concept of the molecular structure of a discotic liquid crystal compound. The discotic liquid crystal is described in various documents, such as C. Destrade et al., Mol. Crysr. Liq. Cryst., vol. 71, page 111 (1981); Japan Chemical Society, Quarterly Chemical Review (written in Japanese), chapter 5 and chapter 10, section 2 (1994); B. Kohne et al., Angew. Chem. Soc. Chem. Comm., page 1794 (1985); and J. Zhang et al., J. Am. Chem. Soc., vol. 116, page 2655 (1994).

Examples of the discotic cores (D) are shown below. In the following examples, Y is a group represented by —O—CO—CR$^1$═CR$^2$—X—R$^3$.

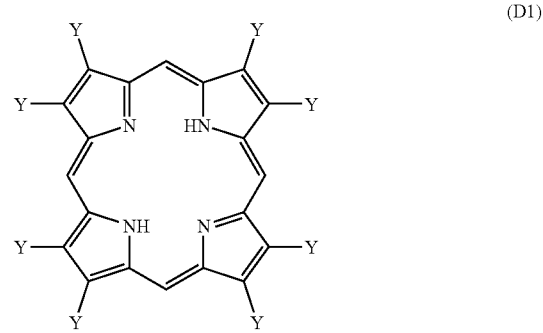

(D1)

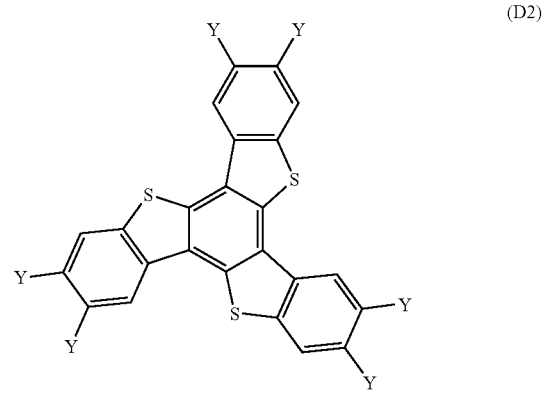

(D2)

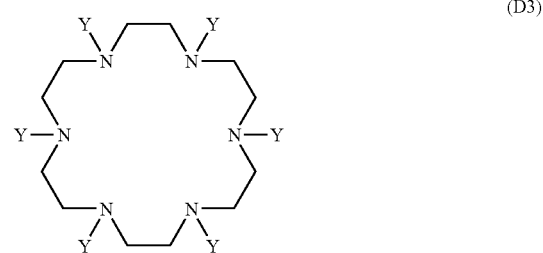

(D3)

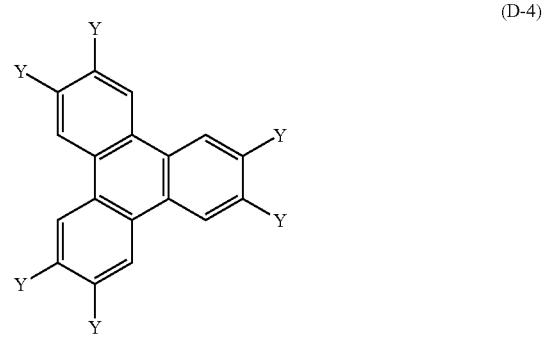

(D-4)

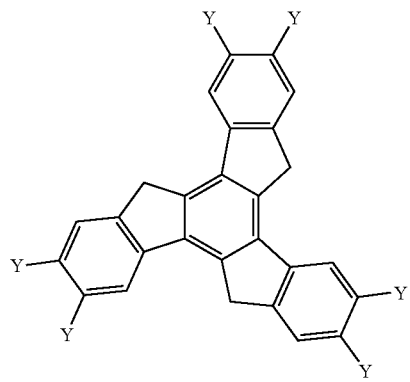 (D-5)
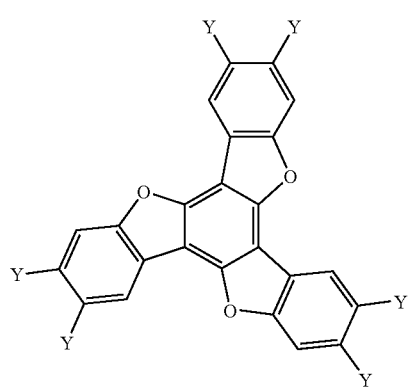 (D6)
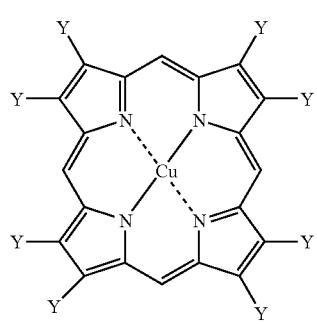 (D7)
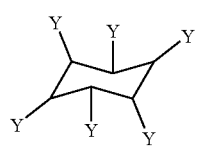 (D8)
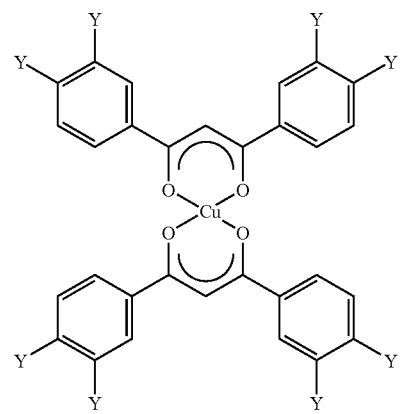 (D9)
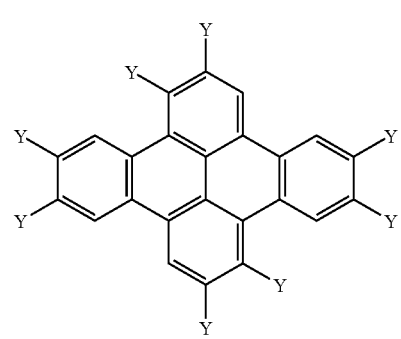 (D10)
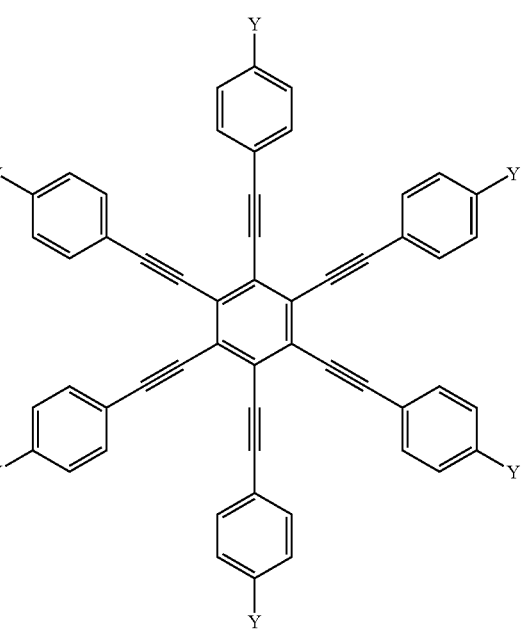 (D11)

-continued

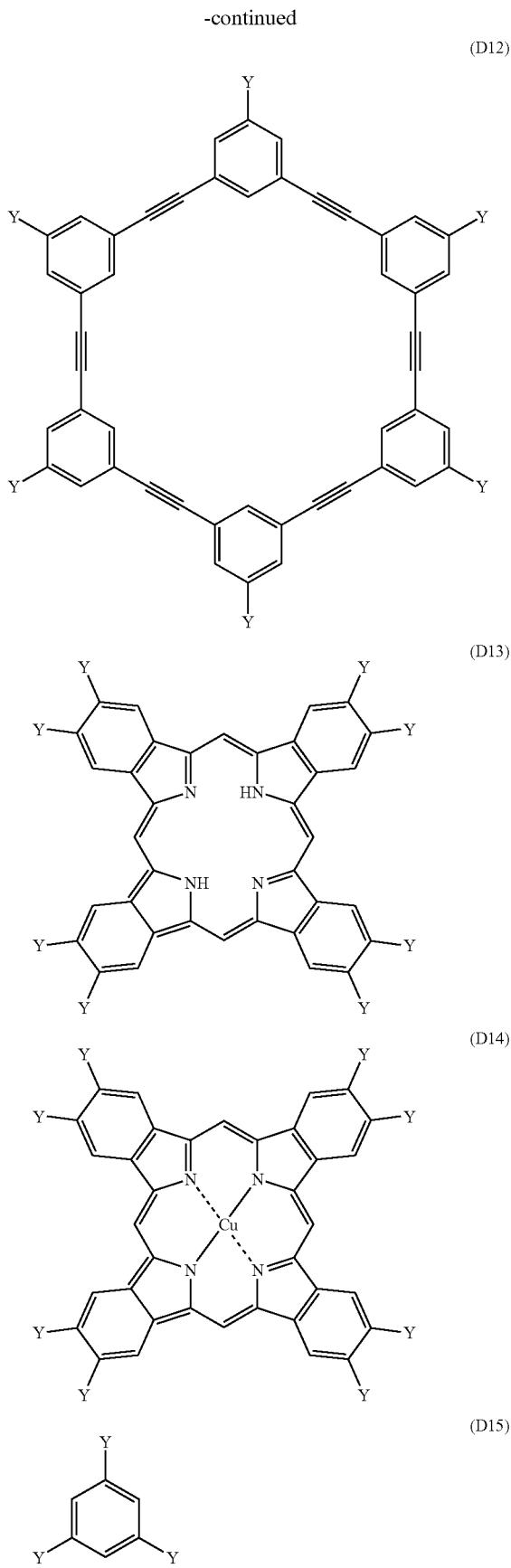

(D12)
(D13)
(D14)
(D15)

-continued

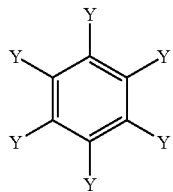

(D16)

The discotic core (D) is preferably triphenylene (D4).

The discotic core (D) may have a substituent group other than Y ($-O-CO-CR^1=CR^2-X-R^3$).

Examples of the substituent groups include a halogen atom (fluorine, chlorine, bromine, iodine), cyano, hydroxyl, amino, carbamoyl, sulfamoyl, mercapto, ureido, an alkyl group, a substituted alkyl group, an alkenyl group, a substituted alkenyl group, an alkynyl group, a substituted alkynyl group, an aryl group, a substituted aryl group, a heterocyclic group, an alkoxy group, a substituted alkoxy group, an aryloxy group, a substituted aryloxy group, an acyl group, an acyloxy group, an alkoxycarbonyl group, a substituted alkoxycarbonyl group, an aryloxycarbonyl group, a substituted aryloxycarbonyl group, a substituted amino group, an amido group, an imido group, an alkoxycarbonylamino group, a substituted alkoxycarbonylamino group, an aryloxycarbonylamino group, a substituted aryloxycarbonylamino group, a substituted carbamoyl group, a sulfonamido group, a substituted sulfamoyl group, an alkylthio group, a substituted alkylthio group, an arylthio group, a substituted arylthio group, an alkylsulfonyl group, a substituted alkylsulfonyl group, an arylsulfonyl group, a substituted arylsulfonyl group, an alkylsulfinyl group, a substituted alkylsulfinyl group, an arylsulfinyl group, a substituted arylsulfinyl group, a substituted ureido group, a phosphoric amido group, and a substituted silyl group.

The alkyl group can have a cyclic or branched structure. The alkyl group preferably has 1 to 30 carbon atoms. Examples of the cycloalkyl group (alkyl group having a cyclic structure) include the above-described discotic cores. In other words, the compound can have a molecular structure containing two or more discotic cores, which connect to each other.

The alkyl moiety of the substituted alkyl group is the same as the alkyl group (which can be a discotic core). Examples of the substituent group of the substituted alkyl group are the same as those of the discotic core except an alkyl group, a substituted alkyl group, an alkenyl group, a substituted alkenyl group, an alkynyl group and a substituted alkynyl group.

The alkenyl group can have a cyclic or branched structure. The alkenyl group has preferably 2 to 30 carbon atoms.

The alkenyl moiety of the substituted alkenyl group is the same as the alkenyl group. Examples of the substituent group of the substituted alkenyl group are the same as those of the substituted alkyl group.

The alkynyl group can have a cyclic or branched structure. The alkynyl group has preferably 2 to 30 carbon atoms.

The alkynyl moiety of the substituted alkynyl group is the same as the alkynyl group. Examples of the substituent group of the substituted alkynyl group are the same as those of the substituted alkyl group.

The aryl group has preferably 6 to 30 carbon atoms. Examples of the aryl group include the above-described discotic cores. In other words, the compound can have a molecular structure containing two or more discotic cores, which connect to each other.

The aryl moiety of the substituted aryl group is the same as the aryl group (which can be a discotic core). Examples of the substituent group of the substituted aryl group are the same as those of the discotic core.

The heterocyclic group preferably has a 5- or 6-membered heterocyclic ring. The heterocyclic ring can be condensed with another heterocyclic ring, an aliphatic ring or an aromatic ring. The heteroatom of the heterocyclic ring is preferably nitrogen, oxygen or sulfur. Examples of the heterocyclic group include the above-described discotic cores. In other words, the compound can have a molecular structure containing two or more discotic cores, which connect to each other.

The heterocyclic group can have a substituent group. Examples of the substituent group of the heterocyclic group are the same as those of the discotic core.

The alkyl moiety of the alkoxy group or the substituted alkoxy group is the same as the alkyl group (which can be a discotic core). Examples of the substituent group of the substituted alkoxy group are the same as those of the substituted alkyl group.

The aryl moiety of the aryloxy group or the substituted aryloxy group is the same as the aryl group (which can be a discotic core). Examples of the substituent group of the substituted aryloxy group are the same as those of the discotic core.

The acyl group is formyl or a group represented by —CO—R in which R is an alkyl group, a substituted alkyl group, an alkenyl group, a substituted alkenyl group, an alkynyl group, a substituted alkynyl group, an aryl group or a substituted aryl group.

The acyloxy group is formyloxy or a group represented by —O—CO—R in which R is an alkyl group, a substituted alkyl group, an alkenyl group, a substituted alkenyl group, an alkynyl group, a substituted alkynyl group, an aryl group or a substituted aryl group.

The alkyl moiety of the alkoxycarbonyl group or the substituted alkoxycarbonyl group is the same as the alkyl group (which can be a discotic core). Examples of the substituent group of the substituted alkoxycarbonyl group are the same as those of the substituted alkyl group.

The aryl moiety of the aryloxycarbonyl group or the substituted aryloxycarbonyl group is the same as the aryl group (which can be a discotic core). Examples of the substituent group of the substituted aryloxycarbonyl group are the same as those of the discotic core.

The substituted amino group is represented by —NH—R or —N(—R)$_2$ in which R is an alkyl group, a substituted alkyl group, an alkenyl group, a substituted alkenyl group, an alkynyl group, a substituted alkynyl group, an aryl group or a substituted aryl group.

The amido group is represented by —NH—CO—R in which R is an alkyl group, a substituted alkyl group, an alkenyl group, a substituted alkenyl group, an alkynyl group, a substituted alkynyl group, an aryl group or a substituted aryl group.

The imido group is represented by —N(—CO—R)$_2$ in which R is an alkyl group, a substituted alkyl group, an alkenyl group, a substituted alkenyl group, an alkynyl group, a substituted alkynyl group, an aryl group or a substituted aryl group.

The alkyl moiety of the alkoxycarbonylamino group or the substituted alkoxycarbonylamino group is the same as the alkyl group (which can be a discotic core). Examples of the substituent group of the substituted alkoxycarbonyl-amino group are the same as those of the substituted alkyl group.

The aryl moiety of the aryloxycarbonylamino group or the substituted aryloxycarbonylamino group is the same as the aryl group (which can be a discotic core). Examples of the substituent group of the substituted aryloxycarbonyl-amino group are the same as those of the discotic core.

The substituted carbamoyl group is represented by —CO—NH—R or —CO—N(—R)$_2$ in which R is an alkyl group, a substituted alkyl group, an alkenyl group, a substituted alkenyl group, an alkynyl group, a substituted alkynyl group, an aryl group or a substituted aryl group.

The sulfonamido group is represented by —NH—SO$_2$—R in which R is an alkyl group, a substituted alkyl group, an alkenyl group, a substituted alkenyl group, an alkynyl group, a substituted alkynyl group, an aryl group or a substituted aryl group.

The substituted sulfamoyl group is represented by —SO$_2$—NH—R or —SO$_2$—N(—R)$_2$ in which R is an alkyl group, a substituted alkyl group, an alkenyl group, a substituted alkenyl group, an alkynyl group, a substituted alkynyl group, an aryl group or a substituted aryl group.

The alkyl moiety of the alkylthio group or the substituted alkylthio group is the same as the alkyl group (which can be a discotic core). Examples of the substituent group of the substituted alkylthio group are the same as those of the substituted alkyl group.

The aryl moiety of the arylthio group or the substituted arylthio group is the same as the aryl group (which can be a discotic core). Examples of the substituent group of the substituted arylthio group are the same as those of the discotic core.

The alkyl moiety of the alkylsulfonyl group or the substituted alkylsulfonyl group is the same as the alkyl group (which can be a discotic core). Examples of the substituent group of the substituted alkylsulfonyl group are the same as those of the substituted alkyl group.

The aryl moiety of the arylsulfonyl group or the substituted arylsulfonyl group is the same as the aryl group (which can be a discotic core). Examples of the substituent group of the substituted arylsulfonyl group are the same as those of the discotic core.

The alkyl moiety of the alkylsulfinyl group or the substituted alkylsulfinyl group is the same as the alkyl group (which can be a discotic core). Examples of the substituent group of the substituted alkylsulfinyl group are the same as those of the substituted alkyl group.

The aryl moiety of the arylsulfinyl group or the substituted arylsulfinyl group is the same as the aryl group (which can be a discotic core). Examples of the substituent group of the substituted arylsulfinyl group are the same as those of the discotic core.

The substituted ureido group is represented by —NH—CO—NH—R or —NH—CO—N(—R)$_2$ in which R is an alkyl group, a substituted alkyl group, an alkenyl group, a substituted alkenyl group, an alkynyl group, a substituted alkynyl group, an aryl group or a substituted aryl group.

The phosphoric amide group is represented by —NH—O—P(=O)(—OH)—O—R or —NH—O—P(=O)(—O—R)$_2$ in which R is an alkyl group, a substituted alkyl group, an alkenyl group, a substituted alkenyl group, an alkynyl group, a substituted alkynyl group, an aryl group or a substituted aryl group.

The substituted silyl group is represented by —SiH$_2$—R, —SiH(—R)$_2$ or —Si(—R)$_3$ in which R is an alkyl group, a substituted alkyl group, an alkenyl group, a substituted alkenyl group, an alkynyl group, a substituted alkynyl group, an aryl group or a substituted aryl group.

In the formula (I), n is an integer of 3 to 20, preferably 3 to 15, more preferably 3 to 12, further preferably 3 to 10, furthermore preferably 4 to 8, and most preferably 6.

In the formula (I), each of $R^1$ and $R^2$ is independently hydrogen, a halogen atom, an alkyl group or a substituted alkyl group, or otherwise $R^1$ and $R^2$ are combined to form an aliphatic ring. Description of the alkyl group and the substituted alkyl group given above for the discotic core can be also applied for these groups.

Each of $R^1$ and $R^2$ is preferably independently hydrogen, a halogen atom, an alkyl group or a substituted alkyl group, rather than they are combined to form an aliphatic ring. Each of $R^1$ and $R^2$ independently is more preferably hydrogen, a halogen atom, an alkyl group having 1 to 30 carbon atoms or a substituted alkyl group having 1 to 30; further preferably hydrogen, a halogen atom or an alkyl group having 1 to 30 carbon atoms; furthermore preferably hydrogen or an alkyl group having 1 to 6 carbon atoms; still further preferably hydrogen or methyl; most preferably hydrogen.

The double bonds in the formula (I) are preferably in trans-form rather than in cis-form.

In the formula (I), two or more groups represented by —O—CO—$CR^1$=$CR^2$—X—$R^3$ can be different from each other. They, however, are preferably the same.

In the formula (I), X is —O—, —S— or —NR— in which R is hydrogen or an alkyl group, preferably hydrogen or an alkyl group having 1 to 6 carbon atoms, and more preferably hydrogen or an alkyl group having 1 to 3 carbon atoms. In the formula (I), X is preferably —O— or —S—, and more preferably —O—.

In the formula (I), $R^3$ is an alkyl group, a substituted alkyl group, an aryl group or a substituted aryl group.

The alkyl group, the substituted alkyl group, the aryl group and the substituted aryl group are the same as the groups described as the substituent groups of the discotic core.

The discotic compound represented by the formula (I) can have a polymerizable group. The discotic compound having a polymerizable group (polymerizable discotic compound) can be polymerized to fix molecules thereof aligned so that their discotic planes are oriented, and thereby the orientation can be fixed.

In the case where the compound of the formula (I) has a polymerizable group, $R^3$ is preferably a substituted alkyl group or a substituted aryl group, and preferably has a substituent group in which a polymerizable group is positioned at the terminal.

The polymerizable discotic compound is preferably represented by the following formula (II).

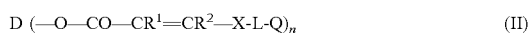

D (—O—CO—$CR^1$=$CR^2$—X-L-Q)$_n$      (II)

In the formula (II), D is a discotic core.

In the formula (II), n is an integer of 3 to 12.

In the formula (II), each of $R^1$ and $R^2$ is independently hydrogen, a halogen atom, an alkyl group or a substituted alkyl group; or otherwise they are combined to form an aliphatic ring.

In the formula (II), X is —O—, —S— or —NR— in which R is hydrogen or an alkyl group.

These D, n, $R^1$, $R^2$ and X are the same as those defined in the formula (I).

In the formula (II), L is an alkylene group, a substituted alkylene group, an arylene group, a substituted arylene group or a divalent linking group consisting of a combination of an alkylene group, a substituted alkylene group, an arylene group or a substituted arylene group with —O— or —CO—.

The alkylene group can have a cyclic or branched structure. The alkylene group preferably has 1 to 30 carbon atoms.

The alkylene moiety of the substituted alkylene group is the same as the alkylene group. Examples of the substituent group of the substituted alkylene group are the same as those of the discotic core in the formula (I) except an alkyl group, a substituted alkyl group, an alkenyl group, a substituted alkenyl group, an alkynyl group and a substituted alkynyl group.

The arylene group preferably has 1 to 30 carbon atoms. The arylene group is preferably phenylene or naphthylene, more preferably naphthylene, and most preferably p-naphthylene.

The arylene moiety of the substituted arylene group is the same as the arylene group. Examples of the substituent group of the substituted arylene group are the same as those of the discotic core in the formula (I).

The linking group L is preferably represented by —AL—O—CO—, —AL—AR—O—AL—O—CO— or —AL—AR—O—AL— (in which the left side is attached to X and the right side is attached to Q). In the formulas, AL is an alkylene group or a substituted alkylene group, and AR is an arylene group or a substituted arylene group.

In the formula (II), Q is a polymerizable group.

The polymerizable group is preferably an epoxy group or an unsaturated group, more preferably an epoxy group or an ethylenically unsaturated group, and most preferably an ethylenically unsaturated group (e.g., vinyl, 1-propenyl, isopropenyl).

A particularly preferred discotic compound is a triphenylene compound represented by the following formula (III).

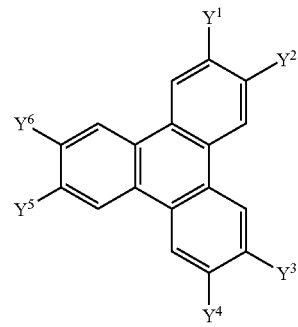

(III)

In the formula (III), each of $Y^1$, $Y^2$, $Y^3$, $Y^4$, $Y^5$ and $Y^6$ is independently a group represented by —O—CO—$CR^1$=$CR^2$—X—$R^3$.

Each of $R^1$ and $R^2$ is independently hydrogen or methyl.

In the formula (III), $R^3$ is an alkyl group having 3 to 20 carbon atoms, a substituted alkyl group having 3 to 20 carbon atoms, an aryl group having 6 to 20 carbon atoms or a substituted aryl group having 6 to 20 carbon atoms.

Definition and examples of these groups are the same as those described for the formula (I).

The triphenylene compound of the formula (III) can have a polymerizable group. The triphenylene compound having a polymerizable group (polymerizable triphenylene compound) can be polymerized to fix molecules thereof aligned so that their discotic planes of triphenylene are oriented, and thereby the orientation can be fixed.

In the case where the triphenylene compound of the formula (III) has a polymerizable group, $R^3$ is preferably a substituted alkyl group having 3 to 20 carbon atoms or a substituted aryl group having 6 to 20 carbon atoms, and preferably has a substituent group in which a polymerizable group is positioned at the terminal. Accordingly, it is preferred that each of $Y^1$, $Y^2$, $Y^3$, $Y^4$, $Y^5$ and $Y^6$ be independently a group represented by —O—CO—$CR^1$=$CR^2$—X-L-Q.

L is preferably represented by —AL—O—CO—, —AL—AR—O—AL—O—CO— or —AL—AR—O—AL— (in which the left side is attached to X and the right side is attached to Q). In the formulas, AL is an alkylene group having 3 to 20 carbon atoms or a substituted alkylene group having 3 to 20 carbon atoms, and AR is an arylene group having 6 to 20 carbon atoms or a substituted arylene group having 6 to 20 carbon atoms.

Examples of the divalent linking group L are the same as those of the formula (II).

In the above formula, Q is a polymerizable group.

The polymerizable group is preferably epoxy or an unsaturated group, more preferably epoxy or an ethylenically unsaturated group, most preferably an ethylenically unsaturated group (e.g., vinyl, 1-propenyl, isopropenyl).

Examples of the discotic compounds represented by the formula (I) are shown below.

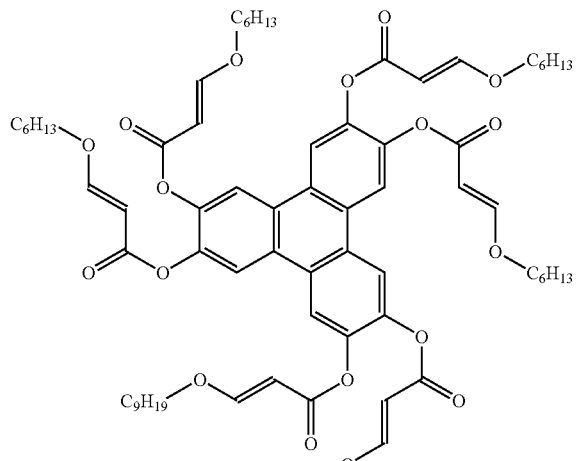

(1)

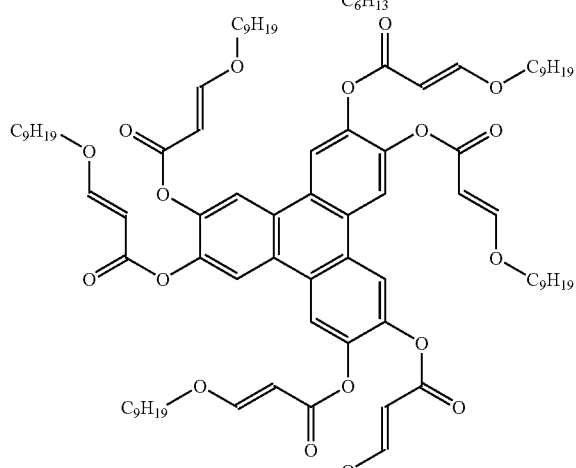

(2)

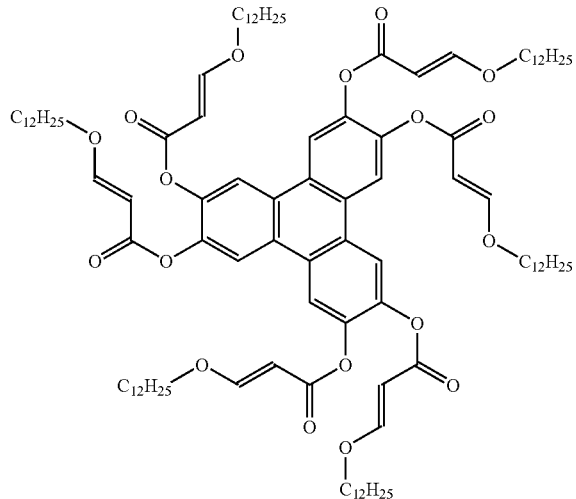

(3)

(4)
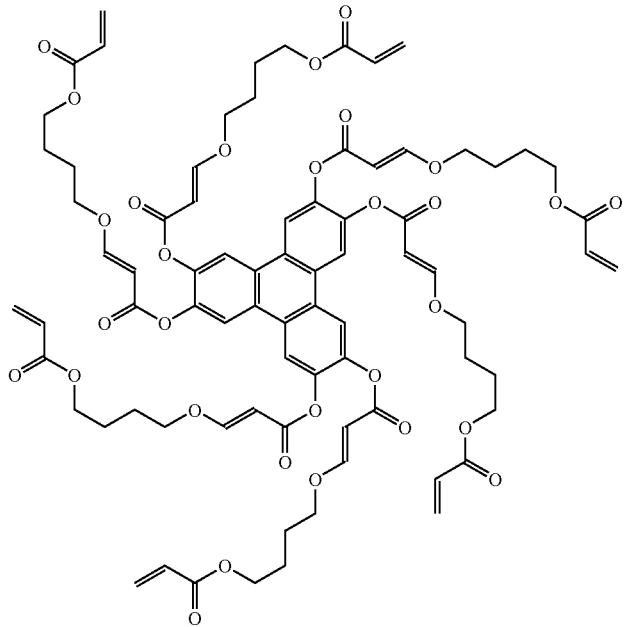
(5)
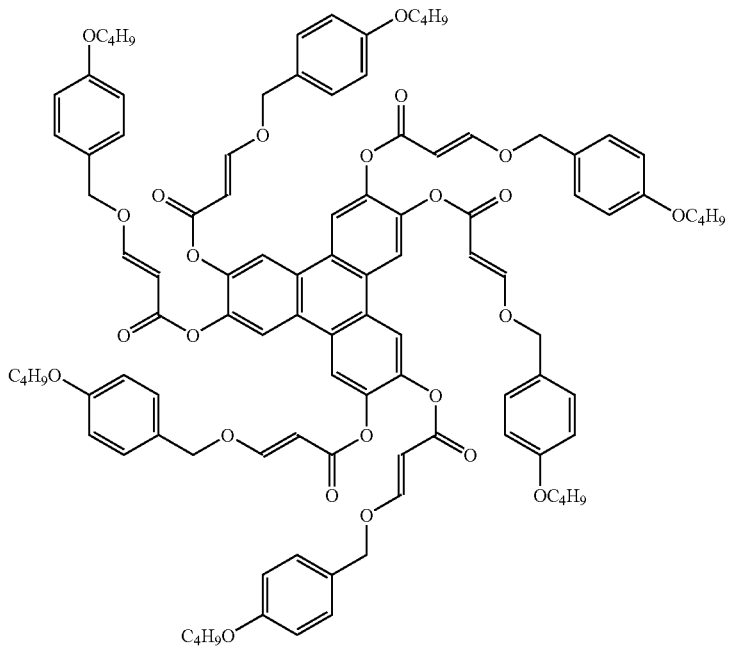

-continued
(6)
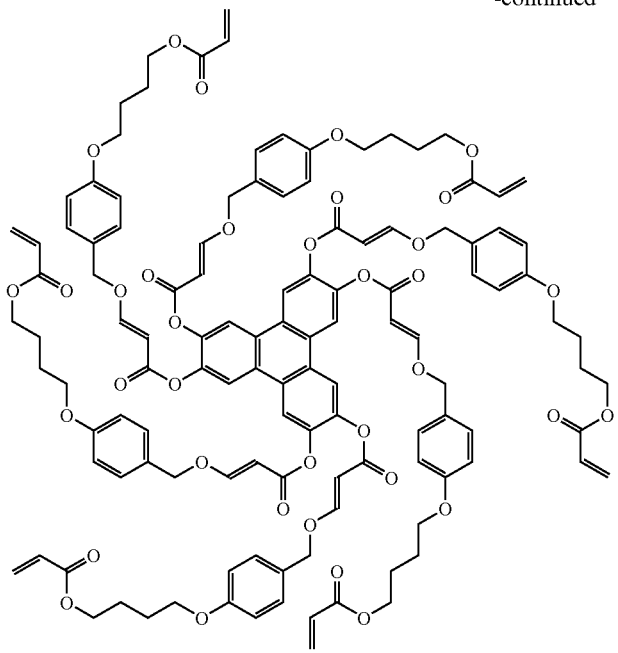
(7)
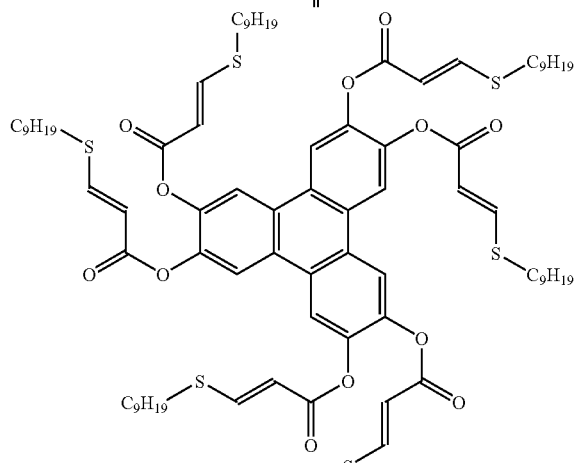
(8)
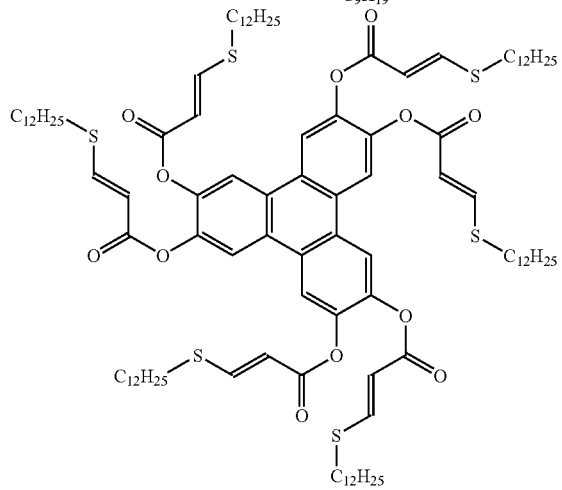

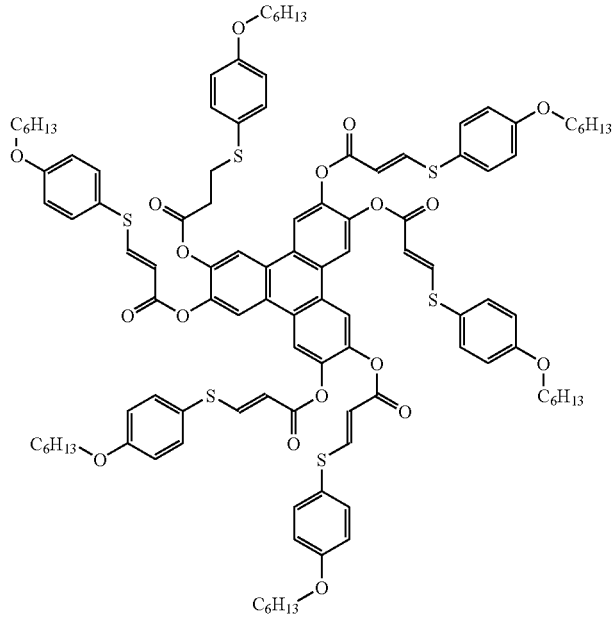
(9)
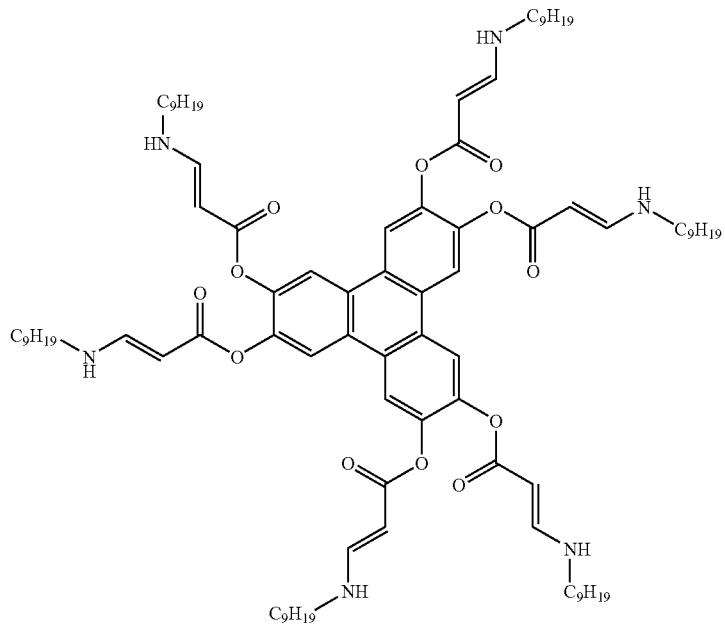
(10)

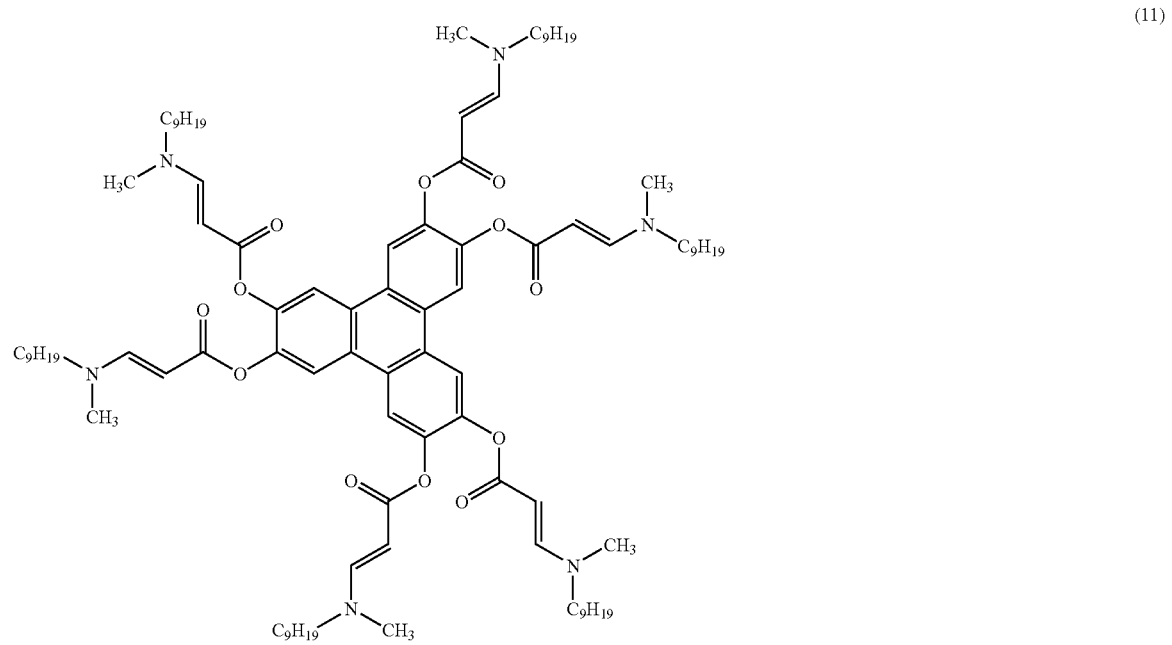
(11)
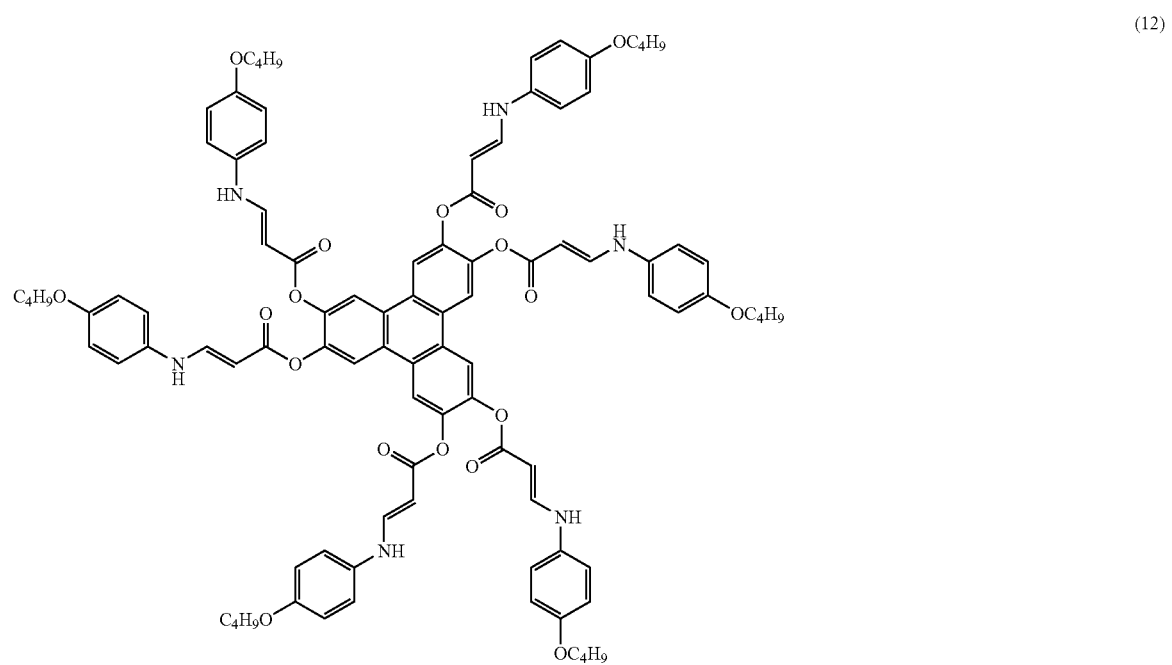
(12)

-continued
(13)
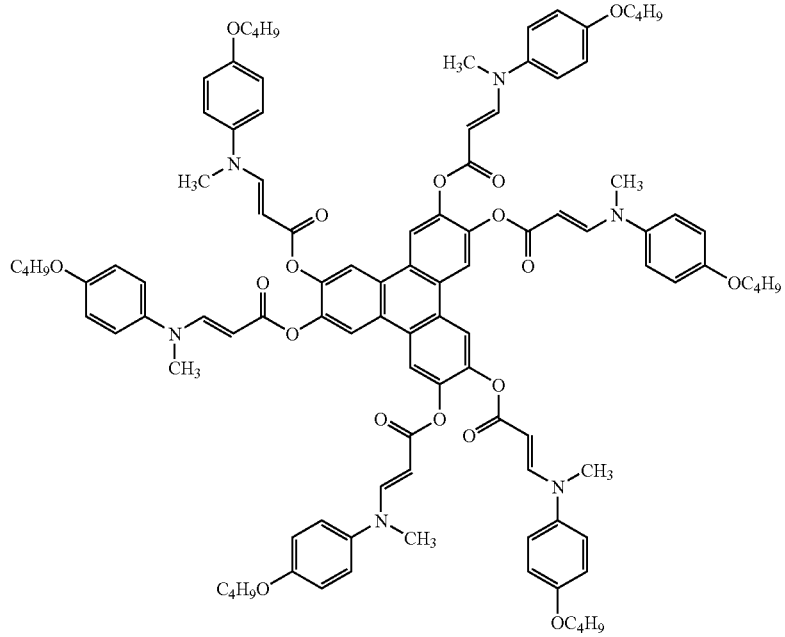
(14)
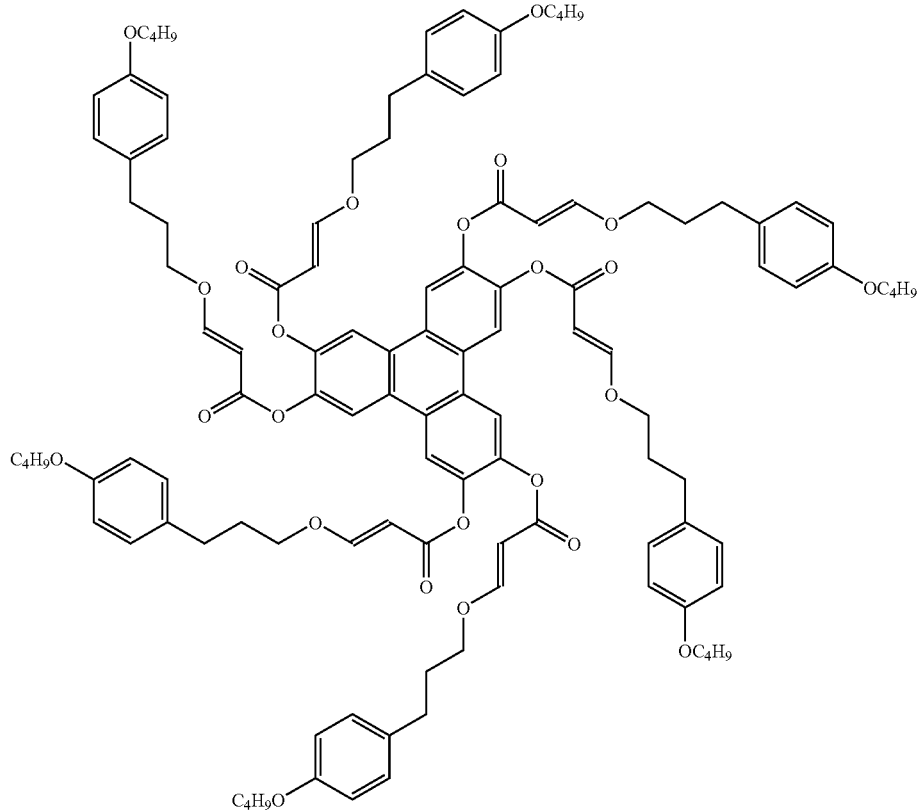

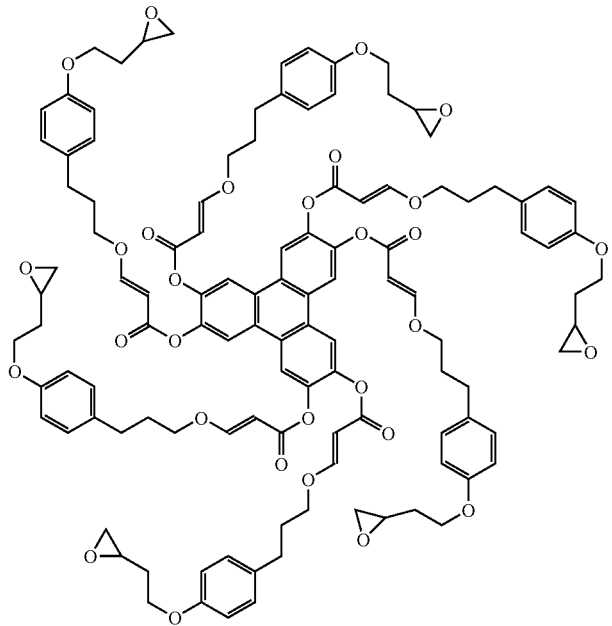
(15)
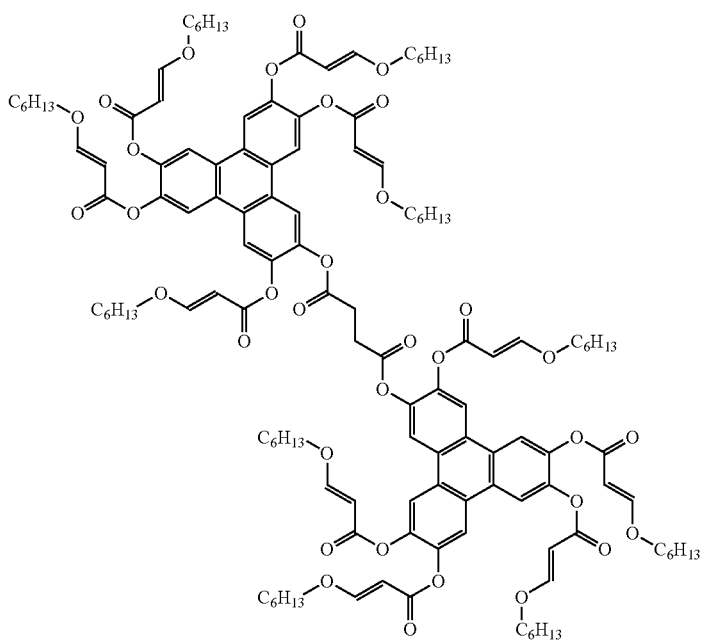
(16)

The discotic compound represented by the formula (I) can be prepared in the manner described in the following synthesis examples.

SYNTHESIS EXAMPLE 1

The compound (1) was synthesized according to the following reaction scheme.

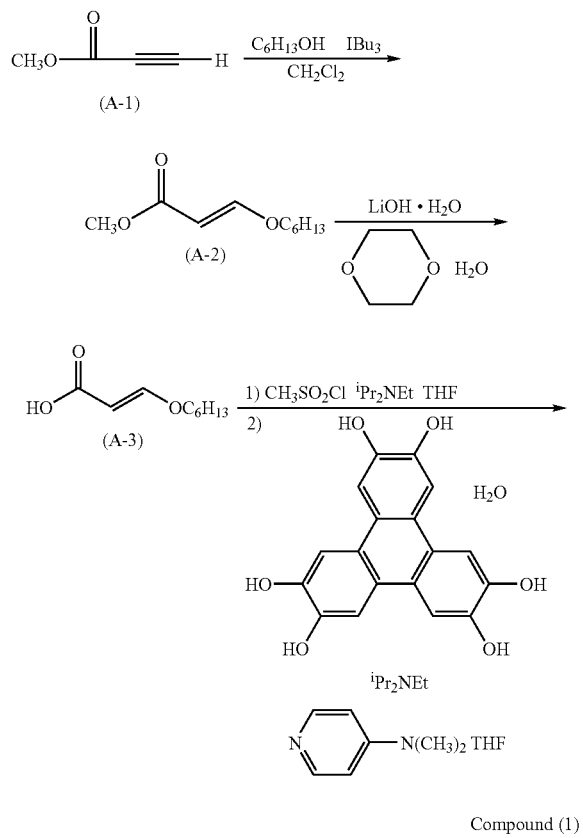

Compound (1)

Into 400 ml of methylene chloride solution containing 78.7 mmol of the compound (A-1) and 78.7 mmol of hexanol, 11.8 mmol of tributylphosphine was added while the temperature was kept at 10° C. or below. After heated to 25° C., the mixture was stirred overnight. To the resultant liquid, water was added. The organic portion was collected and dried with magnesium sulfate anhydride, and then the solvent was distilled away under reduced pressure. The residue was purified through a silica-gel column chromatography (eluting solvent: ethyl acetate/hexane=1/5), to obtain the compound (A-2) [yield: 90%].

Into 130 ml of dioxane solution containing 70.9 mmol of the compound (A-2), 85 ml of aqueous solution containing 142 mmol of lithium hydroxide monohydrate was added at room temperature. After the heater was set so that the external temperature might be 100° C., the mixture was stirred for 1.5 hours. The resultant solution was neutralized with diluted hydrochloric acid, and then ethyl acetate was added. The organic portion was collected and dried with magnesium sulfate anhydride, and then the solvent was distilled away under reduced pressure. The residue was purified through a silica-gel column chromatography (eluting solvent: ethyl acetate/hexane=1/3), to obtain the compound (A-3) [yield: 76%].

While chilled with ice, 15 ml of tetrahydrofuran solution containing 11.6 mmol of methanesulfonyl chloride and 11.6 mmol of diisopropylethylamine was dropwise added into 30 ml of tetrahydrofuran solution containing 11.6 mmol of the compound (A-3). The obtained mixture was heated to room temperature, and stirred for 1 hour. The solution was cooled with ice again, and 15 ml of tetrahydrofuran solution containing 1.22 mmol of 2,3,6,7,10,11-hexahydroxy-triphenylene monohydrate was added. After 15 ml of tetrahydrofuran solution containing 11.6 mmol of diisopropylethylamine was further dropwise added, a catalytic amount of N,N-dimethylaminopyridine was added. The resultant solution was heated to room temperature, and stirred for 4 hours. Ethyl acetate was added, and the organic portion was collected and washed three times with diluted hydrochloric acid. After the organic portion was dried with magnesium sulfate anhydride, the solvent was distilled away under reduced pressure. The residue was purified through a silica-gel column chromatography (eluting solvent: ethyl acetate/hexane=1/3), to obtain the compound (1) [yield: 21%].

Phase transition temperature: C-113° C.—$N_D$-143° C.-Iso $^1$H NMR (300 MHz, CDCl$_3$) δ 0.92 (t, J=6.7 Hz, 18H), 1.20-1.52 (m, 36H), 1.65-1.87 (m, 12H), 3.94 (t, J=6.5 Hz, 12H), 5.42 (d, J=13 Hz, 6H), 7.82 (d, J=13 Hz, 6H), 8.27 (s, 6H)

SYNTHESIS EXAMPLE 2

The compound (2) was synthesized in the same manner as the compound (1) in Synthesis Example 1. The phase transition temperature was determined by observation with a polarizing microscope. As a result, $N_D$ phase and Iso phase were observed at room temperature (25° C.) and at 61° C., respectively.

$^1$H NMR (300 MHz, CDCl$_3$) δ0.83 (t, J=3.5 Hz, 18H), 1.16-1.52 (m, 72H), 1.68-1.87 (m, 12H), 3.94 (t, J=6.5 Hz, 12H), 5.42 (d, J=13 Hz, 6H), 7.82 (d, J=13 Hz, 6H), 8.28 (s, 6H)

SYNTHESIS EXAMPLE 3

The compound (3) was synthesized in the same manner as the compound (1) in Synthesis Example 1. The phase transition temperature was determined by observation with a polarizing microscope. As a result, $N_D$ phase was observed at 89° C. in bringing down the temperature.

$^1$H NMR (300 MHz, CDCl$_3$) δ0.89 (t, J=6.6 Hz, 18H), 1.18-1.50 (m, 108H), 1.68-1.84 (m, 12H), 3.94 (t, J=6.5 Hz, 12H), 5.42 (d, J=13 Hz, 6H), 7.82 (d, J=13 Hz, 6H), 8.27 (s, 6H)

SYNTHESIS EXAMPLE 4

The compound (5) was synthesized in the same manner as the compound (1) in Synthesis Example 1.

Phase transition temperature: C-127° C.-$N_D$-155° C.-Iso $^1$H NMR (300 MHz, CDCl$_3$) δ0.98 (t, J=7.4 Hz, 18H), 1.40-1.62 (m, 12H), 1.77 (dt, J=6.6, 2.7 Hz, 12H), 3.97 (t, J=6.3 Hz, 12H), 4.91 (s, 12H), 5.52 (d, J=13 Hz, 6H), 6.91 (d, J=8.4 Hz, 12H), 7.29 (d, J=8.4 Hz, 12H), 7.89 (d, J=13 Hz, 6H), 8.26 (s, 6H)

SYNTHESIS EXAMPLE 5

The above compound (7) was synthesized according to the following reaction scheme.

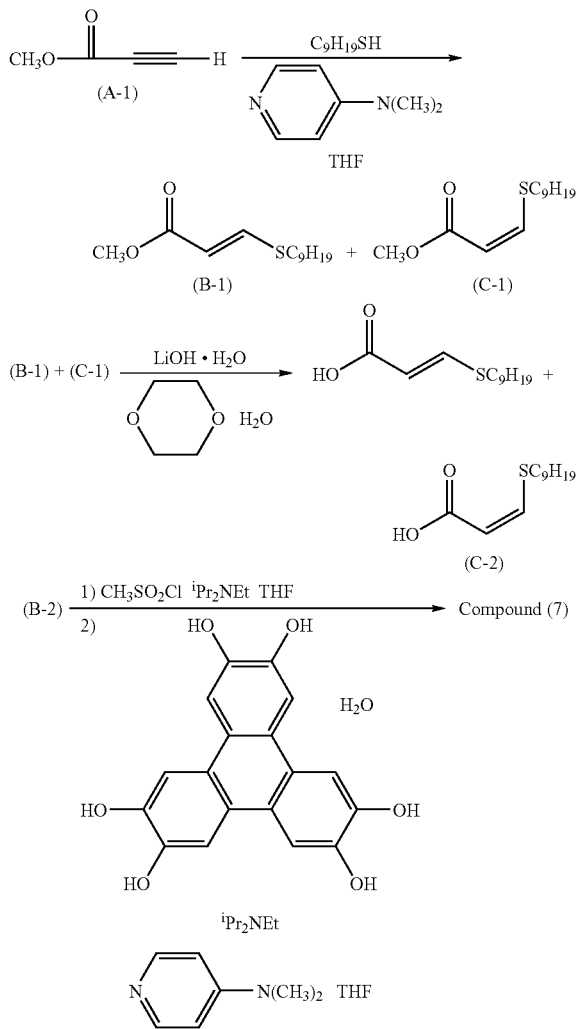

Into 360 ml of tetrahydrofuran solution containing 73.5 mmol of the compound (A-1) and 73.5 mmol of nonanethiol, 73.5 mmol of N,N-dimethylaminopyridine was added at the temperature of 0° C. or below. The mixture was stirred for 5.5 hours at the temperature of 10° C. or below. After ethyl acetate and diluted hydrochloric acid were added, the organic portion was collected and dried with magnesium sulfate anhydride. The solvent was distilled away under reduced pressure, and the residue was purified through a silica-gel column chromatography (eluting solvent: ethyl acetate/hexane=1/20 to 1/15), to obtain a mixture of the compounds (B-1) and (C-1) [(B-1)/(C-1)=10/1] [yield: 68%].

Into 70 ml of dioxane solution containing 21.6 mmol of the mixture of (B-1) and (C-1), 45 ml of aqueous solution containing 43.2 mmol of lithium hydroxide monohydrate was added at room temperature. After the heater was set so that the external temperature might be 100° C., the mixture was stirred for 1 hour. The resultant solution was neutralized with diluted hydrochloric acid, and then ethyl acetate was added. The organic portion was collected and dried with magnesium sulfate anhydride, and then the solvent was distilled away under reduced pressure. Thus, a mixture of the compounds (B-2) and (C-2) [(B-2)/(C-2)=10/1] was obtained. The obtained mixture was recrystallized from a mixed solvent (ethyl acetate/hexane=1/60) to obtain the compound (B-2) [yield: 60%].

While chilled with ice, 5 ml of tetrahydrofuran solution containing 13.0 mmol of methanesulfonyl chloride and 13.7 mmol of diisopropylethylamine was dropwise added into 25 ml of tetrahydrofuran solution containing 13.0 mmol of the compound (B-2). The obtained mixture was heated to room temperature, and stirred for 1 hour. The solution was cooled with ice again, and 7 ml of tetrahydrofuran solution containing 1.44 mmol of 2,3,6,7,10,11-hexahydroxytriphenylene monohydrate was added. After 5 ml of tetrahydrofuran solution containing 13.7 mmol of diisopropylethylamine was further dropwise added, a catalytic amount of N,N-dimethylaminopyridine was added. The resultant solution was heated to room temperature, and stirred for 3 hours. Ethyl acetate was added, and the organic portion was collected and washed three times with diluted hydrochloric acid. After the organic portion was dried with magnesium sulfate anhydride, the solvent was distilled away under reduced pressure. The residue was purified through a silica-gel column chromatography (eluting solvent: ethyl acetate/hexane=1/7), to obtain the compound (7) [yield: 57%].

Phase transition temperature: C-45° C.-$N_D$-46° C.-Iso $^1$H NMR (300 MHz, CDCl$_3$) δ0.89 (t, J=6.3 Hz, 18H), 1.17-1.60 (m, 72H), 1.62-1.83 (m, 12H), 2.87 (t, J=7.5 Hz, 12H), 5.94 (d, J=15 Hz, 6H), 7.97 (d, J=15 Hz, 6H), 8.22 (s, 6H)

The discotic compound according to the invention can behave as liquid crystal either by itself or when mixed with other liquid crystal. The liquid crystal phase is preferably $N_D$ phase.

When the discotic compound of the invention is mixed with other liquid crystal compounds, the compound of the invention is contained preferably in the range of 1 to 99 wt. %, more preferably in the range of 10 to 98 wt. %, most preferably in the range of 30 to 95 wt. %, based on the total weight of the mixture.

The liquid crystal compounds used in combination with the discotic compound of the invention are preferably discotic rather than rod-like. Japanese Patent Provisional Publication Nos. 8(1996)-27284, 7(1995)-306317, 9(1997)-104866 and 2001-4837 describe the discotic liquid crystal compounds usable in combination with the compound of the invention.

The compound of the invention behaves as liquid crystal in the temperature range of preferably 0 to 300° C., more preferably 10 to 250° C., most preferably 20 to 200° C.

[Optically anisotropic layer]

The optically anisotropic element in which molecules of the discotic compound represented by the formula (I) are aligned can be used as an optically anisotropic layer of phase retarder (or optical compensatory sheet). The optically anisotropic layer gives optical anisotropy on the basis of the orientation of the discotic compound.

The optically anisotropic layer can be prepared from a composition comprising not only the discotic compound of the invention but also a material for controlling the alignment of the molecules, another material for fixing the alignment and other materials. The discotic compound of the invention is heated up to the liquid crystal phase-forming temperature so that molecules thereof may be aligned, and then cooled with the alignment of the molecules maintained. In this way, the molecules can be fixed without disturbing the alignment. Otherwise, the discotic compound is mixed with a polymerization initiator to prepare a composition, and heated up to the liquid crystal phase-forming temperature so that the molecules are polymerized. The composition is then cooled to fix the alignment of the molecules. In the present invention, the thus-fixed alignment is preferably and typically identical with the alignment in which the molecules are oriented. However, they may be different from each other as long as the fixed alignment is so stably kept and not changed that the layer is neither fluid nor deformed even if the temperature changes in the range of normally 0° C. to 50° C., severely −30° C. to 70° C. and even if external force (for example, given by external field) is applied.

If once the alignment is fixed, the liquid crystal composition no longer needs to behave as liquid crystal. For example, in the case where a polymerizable liquid crystal compound is used, molecules thereof may be thermo- or photo-chemically polymerized or cross-linked to prepare a polymer that no longer behaves as liquid crystal.

[Phase Retarder]

The phase retarder comprises an optically anisotropic layer formed from the discotic compound of the invention. In other words, the discotic compound of the invention is used as a material for the optically anisotropic layer. For example, in the case where a polymerizable discotic compound according to the invention is used to prepare the optically anisotropic layer, the compound is polymerized alone or with other compounds to form an optically anisotropic layer made of a polymer containing units derived from the compound of the invention. The thus-formed optically anisotropic layer is also included in the present invention.

The phase retarder typically comprises a transparent support and an optically anisotropic layer formed from the discotic compound of the invention. The optically anisotropic layer can be formed by the steps of: coating an orientation layer with a composition comprising the discotic compound of the invention and, if needed, other additives; and fixing molecules of the discotic compound in the manner described above. If once the alignment of the molecules is fixed, the formed optically anisotropic layer can be transferred onto another support. This is because the molecules once fixed when they are aligned can keep the alignment without the orientation layer. Accordingly, the phase retarder does not always need to comprise an orientation layer. The optically anisotropic layer has a thickness of preferably 0.1 to 20 μm, more preferably 0.2 to 15 μm, and most preferably 0.5 to 10 μm.

[Additives of Optically Anisotropic Layer]

In preparing the optically anisotropic layer, additives may be mixed with the discotic compound. Examples of the additives include an agent for controlling alignment of molecules on the interface between the layer and air (alignment controller for air interface), an anti-repelling agent, a polymerization initiator and a polymerizable monomer.

[Alignment Controller for Air Interface]

Liquid crystal molecules on the interface between the layer and air are oriented with a pre-tilt angel of the interface. The pre-tilt angel is categorized into three. One is an angle between the interface and the direction of refractive index nx, another is an angle between the interface and the direction of refractive index ny, and the other is an angle between the interface and the direction of refractive index nz. The pre-tilt angel depends upon the liquid crystal compound, and hence it is necessary to control the pre-tilt angel so that the aimed characters can be obtained.

The pre-tilt angel is preferably controlled with additives though it can be controlled by applying external field such as electric field or magnetic field.

A preferred example of the additives is a compound having a substituted or non-substituted aliphatic group having 6 to 40 carbon atoms or having an oligosiloxanoxy group substituted with a substituted or non-substituted aliphatic group having 6 to 40 carbon atoms. The number of the aliphatic group or the oligosiloxanoxy group is preferably two or more. Hydrophobic excluded volume-effect compounds described in Japanese Patent Publication No. 2002-20363 can be used as the alignment controller for air interface.

The alignment controller is added in an amount of preferably 0.001 to 20 wt. %, more preferably 0.01 to 10 wt. %, and most preferably 0.1 to 5 wt. %, based on the amount of the discotic compound.

[Anti-Repelling Agent]

In order to prevent the orientation layer repelling the composition containing the discotic compound, a polymer material is preferably added to the composition. There is no particular restriction on the polymer material as long as it does not give unfavorable effects to the discotic compound.

Japanese Patent Provisional Publication No. 8(1996)-95030 describes examples of the polymer material. Among them, cellulose esters are particularly preferred. Examples of the cellulose esters include cellulose acetate, cellulose acetate propionate, hydroxypropyl cellulose and cellulose acetate butyrate. The polymer material of anti-repelling agent is added in an amount of preferably 0.1 to 10 wt. %, more preferably 0.1 to 8 wt. %, and most preferably 0.1 to 5 wt. %, based on the amount of the discotic compound.

[Polymerization Initiator]

In the present invention, molecules of the discotic compound are preferably oriented and fixed in mono-domain alignment. Namely, it is preferred that the molecules be evenly aligned and fixed. Accordingly, if the discotic compound is polymerizable, the molecules thereof are fixed preferably by a polymerization reaction, which may be a thermal polymerization reaction caused by a thermal polymerization initiator, a photo-polymerization reaction caused by a photo polymerization initiator or a polymerization reaction caused by electron beams. The photopolymerization reaction or electron beam-polymerization reaction is preferred for fear that the support or other parts may thermally deform or deteriorate during the thermal polymerization reaction. Examples of the photo-polymerization initiators include α-carbonyl compounds (described in U.S. Pat. Nos. 2,367,661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S. Pat. Nos. 2,951,758, 3,046,127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970). The amount of the photo polymerization initiator is preferably in the range of 0.01 to 20 wt. %, and more preferably in the range of 0.5 to 5 wt. % based on the solid content of the coating solution. The light irradiation for the photo polymerization is preferably conducted with ultraviolet rays. The exposure energy is preferably in the range of 10 to 50,000 mJ/cm$^2$, and more preferably in the range of 50 to 800 mJ/cm$^2$. The light irradiation can be conducted while the layer is heated to accelerate the photo polymerization reaction. If the aimed polymerization degree is not obtained in air, oxygen gas content in the atmosphere may be reduced by, for example, introducing nitrogen gas. This is because the oxygen gas often lowers the polymerization degree. The oxygen gas content is preferably 10% or less, more preferably 7% or less, most preferably 3% or less.

[Polymerizable Monomer]

To the liquid crystal composition for forming the optically anisotropic layer, a polymerizable monomer may be added. There is no particular restriction on the polymerizable monomer usable with the liquid crystal compound, as long as it is compatible with the liquid crystal compound and it neither changes the inclined angle nor disturbs the alignment of the liquid crystal molecules. Preferred are compounds having polymerizable ethylenically unsaturated groups such as vinyl, vinyloxy, acryloyl and methacryloyl. The amount of the polymerizable monomer is generally in the range of 0.5 to 50 wt. %, preferably in the range of 1 to 30 wt. %. Particularly preferred is a monomer having two or more reactive functional groups because adhesion between the orientation layer and the optically anisotropic layer can be improved.

[Solvent]

As a solvent for preparing the liquid crystal composition, an organic solvent is preferably used. Examples of the organic solvent include amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone, methyl isobutyl ketone, cyclohexanone) and ethers (e.g., tetrahydrofuran, 1,2-dimethoxyethane). Alkyl halides and ketones are preferred. Two or more organic solvents can be used in combination.

[Coating Method]

The optically anisotropic layer is formed by the steps of: dissolving or dispersing the liquid crystal composition in the above solvent to prepare a coating solution, spreading the coating solution to coat the orientation layer, and aligning molecules of the discotic compound. The coating solution can be spread according to a conventional coating method (such as a wire-bar coating method, an extrusion coating method, a direct gravure coating method, a reverse gravure coating method or a die coating method).

[Orientation Layer]

The orientation layer can be formed by rubbing treatment of an organic compound (preferably a polymer), by oblique evaporation of an inorganic compound, by formation of a micro groove layer, or by stimulation of an organic compound (e.g., ω-tricosanoic acid, dioctadecylmethylammonium chloride, methyl stearate) according to a Langmuir-Blodgett (LB) method. Further, the aligning function of the orientation layer can be activated by applying an electric or magnetic field to the layer or by irradiating the layer with light.

Any method can be used to form the orientation layer as long as molecules of the discotic compound can be oriented in a desired alignment. However, in the invention, the orientation layer is preferably formed by rubbing a polymer layer or by irradiating a polymer layer with light. An orientation layer formed by rubbing a polymer layer is particularly preferred. The rubbing treatment can be conducted by rubbing a polymer layer with paper or cloth several times in a certain direction, and is preferably conducted in the manner described in "Liquid Crystal Handbook (written in Japanese)", published by Maruzen. The orientation layer preferably has a thickness of 0.01 to 10 µm, more preferably 0.05 to 3 µm.

After aligned with the orientation layer, liquid crystal molecules are fixed with the alignment kept to form an optically anisotropic layer. The thus-formed optically anisotropic layer can be transferred onto a polymer film (or a transparent support). The liquid crystal molecules fixed when they are aligned can keep the alignment without the orientation layer. Accordingly, the resultant phase retarder does not need to comprise the orientation layer (although the orientation layer is indispensable for producing the phase retarder).

Surface energy of the orientation layer is controlled with a polymer material (normally used for the orientation layer) so that the discotic molecules may be aligned. Examples of the polymer materials for orientation layer are described in many publications. Even if formed from any polymer material, the orientation layer preferably has polymerizable groups to improve the adhesion between the discotic compound and the transparent support. The polymer material may have polymerizable groups at side chains of the repeating units or may have polymerizable substituent groups of cyclic groups. The orientation layer preferably forms chemical bonds with liquid crystal molecules on the interface, and such orientation layer is described in Japanese Patent Provisional Publication No. 9(1997)-152509.

[Rubbing Density of Orientation Layer]

The pre-tilt angel of discotic molecules on the interface between the orientation layer and the liquid crystal layer has a relation to rubbing density of the orientation layer. In fact, the higher the rubbing density is, the smaller the pre-tilt angel is. The lower the rubbing density is, the larger the pre-tilt angel is. Accordingly, the pre-tilt angel can be controlled by controlling the rubbing density. The rubbing density can be controlled in the manner described in "Liquid Crystal Handbook (written in Japanese)", published by Maruzen (2000). The rubbing density (L) is defined by the formula (A): L=Nl{1+(2πrn/60v)} in which N stands for how many times the layer is rubbed, l stands for the contact length between the layer and the rubbing roller, r stands for a radius of the rubbing roller, n stand for revolutions of the roller (rpm), and v stands for velocity of the moving stage (per second). According to the formula (A), the rubbing density can be increased by repeating the rubbing treatment, by increasing the contact length, by enlarging the radius of roller, by revving up the roller or by moving the stage more slowly. Naturally, in the case where the rubbing density is wanted to decrease, these may be inversely operated.

[Transparent Support]

The phase retarder may have a support. The support is preferably transparent. There is no particular restriction on the material of the support as long as it is optically isotropic and has a transmittance of 80% or more, but a polymer film is preferably used. Examples of the polymer include cellulose esters (e.g., cellulose diacetate, cellulose triacetate), norbornene-based polymers and polymethacrylic esters. Many commercially available polymers can be used. In consideration of optical characters, cellulose esters are preferred, and cellulose esters of lower fatty acids are more preferred. The term "lower fatty acids" means fatty acids having 6 or less carbon atoms. The number of carbon atoms is preferably 2 (cellulose acetate), 3 (cellulose propionate) or 4 (cellulose butyrate). Cellulose triacetate is particularly preferred. Cellulose esters of mixed fatty acids such as cellulose acetate propionate and cellulose acetate butyrate are also usable. In addition, polymers that originally show birefringence (e.g., polycarbonate, polysulfone) can be also used if modified in the manner described in WO00/26705 to reduce the birefringence.

Cellulose esters preferably used for the transparent support are described below in detail. As the cellulose ester, cellulose acetate having an acetic acid content of 55.0 to 62.5% is preferably used. The acetic acid content is more preferably in the range of 57.0 to 62.0%. The term "acetic acid content" means the amount of combined acetic acid per one unit weight of cellulose. The acetic acid content is determined according to ASTM: D-817-91 (tests of cellulose acetate). The cellulose ester has a viscosity average polymerization degree (DP) of preferably 250 or more, more preferably 290 or more. Further, it is also preferred for the cellulose ester to have a narrow molecular weight distribution of Mw/Mn (Mw and Mn are weight and number average molecular weights, respectively) determined by gel permeation chromatography. The value of Mw/Mn is preferably in the range of 1.0 to 1.7, more preferably in the range of 1.3 to 1.65, most preferably in the range of 1.4 to 1.6.

In a cellulose ester, hydroxyl groups at 2-, 3- and 6-position of cellulose are not equally substituted (namely, the substitution degree at each position is not equal to one third of the total substitution degree), and the substitution degree at 6-position is apt to be relatively small. In the cellulose ester used in the invention, however, the substitution degree at 6-position is preferably larger than those at 2- and 3-positions. The substitution degree at 6-position is preferably 30% to 40%, more preferably 31% to 40%, most preferably 32% to 40%, based on the total substitution degree. Further, the substitution degree at 6-position is preferably 0.88 or more. The hydroxyl at 6-position may be replaced with an acyl group having 3 or more carbon atoms other than acetyl group (e.g., propionyl, butylyl, valeronyl, benzoyl, acryloyl). The substitution degree at each position can be measured by means of NMR. A cellulose ester having a high substitution degree at 6-position can be prepared according to the methods described in Japanese Patent Provisional Publication No. 11(1999)-5851.

The polymer film, particularly, the cellulose acetate film of the transparent support may contain a retardation-increasing agent, to have a proper retardation. The retardation-increasing agent is preferably an aromatic compound having at least two aromatic rings. The retardation-increasing agent is incorporated in an amount of preferably 0.01 to 20 weight parts, more preferably 0.05 to 15 weight parts, most preferably 0.1 to 10 weight parts, based on 100 weight parts of the cellulose acetate. Two or more aromatic compounds may be used in combination. The aromatic ring in the aromatic compound may be an aromatic hydrocarbon ring or an aromatic heterocyclic ring.

As the aromatic hydrocarbon ring, a six-membered ring (namely, a benzene ring) is particularly preferred. The aromatic heterocyclic ring is generally unsaturated. The aromatic heterocyclic ring is preferably a five-, six- or seven-membered ring, and more preferably a five- or six-membered ring. The aromatic heterocyclic ring generally has double bonds as many as possible. The hetero-atom in the ring preferably is nitrogen atom, sulfur atom or oxygen atom, and more preferably is nitrogen atom. Examples of the aromatic heterocyclic ring include furan ring, thiophene ring, pyrrole ring, oxazole ring, isoxazole ring, thiazole ring, isothiazole ring, imidazole ring, pyrazole ring, furazane ring, triazole ring, pyran ring, pyridine ring, pyridazine ring, pyrimidine ring, pyrazine ring and 1,3,5-triazine ring. Preferred aromatic rings are benzene ring, furan ring, thiophene ring, pyrrole ring, oxazole ring, thiazole ring, imidazole ring, triazole ring, pyridine ring, pyrimidine ring, pyrazine ring and 1,3,5-triazine ring. Benzene ring and 1,3,5-triazine ring are more preferred. The aromatic compound preferably contains at least one 1,3,5-triazine ring.

The number of aromatic rings in the aromatic compound is preferably in the range of 2 to 20, more preferably in the range of 2 to 12, further preferably in the range of 2 to 8, and most preferably in the range of 2 to 6. The relation of the two or more aromatic rings is categorized into three cases, namely (a) the case in which the aromatic rings form a condensed ring, (b) the case in which the aromatic rings are connected through a single bond, and (c) the case in which the aromatic rings are connected through a linking group. [In this case, a spiro-bonding is not formed because the rings are aromatic.] The relation of the aromatic rings may be any of the cases (a) to (c). PCT Publication Nos. 01/88574 and 00/2619, Japanese Patent Provisional Publication Nos. 2000-111914, 2000-275434 and Japanese Patent Application No. 2002-70009 describe the retardation-increasing agent.

After a cellulose acetate solution (dope) is prepared, the cellulose acetate film is prepared from the dope according to a solvent casting method. The above retardation-increasing agent may be added to the dope. The dope is cast on a drum or a band, and then evaporated to form the film. Before casting the dope, the concentration of the dope is so adjusted that the solid content is in the range of 18 to 35 wt. %. The surface of the drum or band is preferably polished to give a mirror plane. The casting and drying stages of the solvent cast methods are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Publication Nos. 45(1970)-4554, 49(1974)-5614, Japanese Patent Provisional Publication Nos. 60(1985)-176834, 60(1985)-203430 and 62(1987)-115035. The drum or band preferably has a surface temperature of not higher than 10° C. when the dope is cast. After casting the dope, the dope is preferably dried in flowing air for at least 2 seconds. The formed film is peeled from the drum or band, and can be further dried with hot air to remove the solvent remaining in the film. The temperature of the air can be gradually elevated from 100 to 160° C. Japanese Patent Publication No. 5(1993)-17844 describes this method, by which the time for casting and peeling steps can be shortened. This method requires that the dope be set to gel at the surface temperature of the drum or band.

For preparing the dope, flakes of the materials are dissolved in a solvent such a halogenated hydrocarbon (e.g., dichloromethane), an alcohol (e.g., methanol, ethanol, butanol), an ester (e.g., methyl formate, methyl acetate) or an ether (e.g., dioxane, dioxolane, diethyl ether). A typical solvent for dissolving cellulose acylate is dichloromethane, but in consideration of protecting the global environmental conditions and working conditions, the solvent preferably contains essentially no halogenated hydrocarbon such as dichloromethane. This means the content of halogenated hydrocarbon is preferably less than 5 wt. % or less (more preferably less than 2 wt. %). The cellulose acylate film essentially free from halogenated hydrocarbon and the preparation process thereof are described in Japan institute of invention and innovation technical report No. 2001-1745, published on Mar. 15, 2001.

Two or more cellulose ester solutions (dopes) thus prepared can be cast to form a film having two or more layers. The dopes are cast on a drum or a band, and then evaporated to form the film. Before casting the dopes, the concentration of each dope is so adjusted that the solid content is in the range of 10 to 40 wt. %. The surface of the drum or band is preferably polished to give a mirror plane. In the case where two or more cellulose acetate solutions are used, the solutions may be cast from nozzles provided at intervals in the transferring direction of the support to form a layered film. This method is described in, for example, Japanese Patent Provisional Publication Nos. 61(1986)-158414, 1(1989)-122419 and 11(1999)-198285. The solutions may be cast from two nozzles to form a layered film. This method is described in, for example, Japanese Patent Publication No. 60(1985)-27562, Japanese Patent Provisional Publication Nos. 61(1986)-94724, 61(1986)-947245, 61(1986)-104813, 61(1986)-158413 and 6(1994)-134933. The method described in Japanese Patent Provisional Publication No. 56(1981)-162617 can be also adopted. In that method, a highly viscous cellulose acetate solution is enclosed with a low viscous one, and then the thus-combined solutions are simultaneously extruded and cast.

The cellulose acetate film can be stretched to control the retardation. The stretching ratio is preferably in the range of 0 to 100%. The film is preferably stretched with a tenter. In stretching the film with a tenter, the film are held on both sides with moving clips and then released. The difference between the moving speeds of clips is preferably as small as possible, and the difference of releasing timing is also preferably as small as possible A plasticizer can be added to the cellulose ester film to improve the mechanical strength. The plasticizer has another function of shortening the time for the drying process. Phosphoric esters and carboxylic esters are used as the plasticizer. Examples of the phosphoric esters include triphenyl phosphate (TPP) and tricresyl phosphate (TCP). Examples of the carboxylic esters include phthalic esters and citric esters. Examples of the phthalic esters include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citric esters include triethyl o-acetylcitrate (OACTE) and tributyl o-acetylcitrate (OACTB). Examples of the other carboxylic esters include butyl oleate, methylacetyl ricinoleate, dibutyl sebacate and various trimellitic esters. Phthalic ester plasticizers (DMP, DEP, DBP, DOP, DPP, DEHP) are preferred. DEP and DPP are particularly preferred. The amount of the plasticizer is preferably in the range of 0.1 to 25 wt. %, more preferably in the range of 1 to 20 wt. %, and most preferably in the range of 3 to 15 wt. % based on the amount of the cellulose ester.

Deterioration inhibitors (e.g., antioxidizing agent, peroxide decomposer, radical inhibitor, metal inactivating agent, oxygen scavenger, amine) or ultraviolet absorber can be incorporated into the cellulose ester film. Japanese Patent Provisional Publication Nos. 3(1991)-199201, 5(1993)-1907073, 5(1993)-194789, 5(1993)-271471 and 6(1994)-107854 describe the deterioration inhibitors. The deterioration inhibitor is preferably added in the range of 0.01 to 1 wt. %, and more preferably in the range of 0.01 to 0.2 wt. % based on the amount of the prepared solution (dope). If the amount is less than 0.01 wt. %, the effect of the deterioration inhibitor cannot be expected. If the amount is more than 1 wt. %, the inhibitor often bleeds out on the surface of the film. Butyrated hydroxytoluene (BHT) is particularly preferred as a deterioration inhibitor. Japanese Patent Provisional Publication No. 7(1995)-11056 describes the ultraviolet absorber.

The cellulose ester film is preferably subjected to surface treatment. Examples of the surface treatment include corona discharge treatment, glow discharge treatment, flame treatment, acid treatment, alkali treatment, and ultraviolet (UV) treatment. An undercoating layer disclosed in Japanese Patent Provisional Publication No. 7(1995)-333433 may be provided. In order to ensure planeness of the cellulose acetate film, the temperature of the film is preferably kept under the glass transition temperature (Tg), namely 150° C. or less.

In consideration of adhesion onto the orientation layer, the cellulose acetate film is preferably subjected to the acid or alkali treatment. This means that the cellulose acetate is preferably subjected to a saponification treatment.

The alkali-saponification treatment is explained below, by way of example.

The process of alkali-saponification treatment preferably comprises the steps of: immersing the film in an alkaline solution, neutralizing with an acidic acid, washing with water, and drying. The steps may be repeated. The alkaline solution is a solution of potassium hydroxide or sodium hydroxide. The normality of hydroxyl ion in the solution is preferably in the range of 0.1 to 3.0 N, more preferably in the range of 0.5 to 2.0 N. The temperature of the alkaline solution is preferably in the range of room temperature to 90° C., more preferably in the range of 40 to 70° C.

The cellulose acetate film has a surface energy of preferably 55 mN/m or more, more preferably 60 to 75 mN/m.

The cellulose acetate film has a thickness of preferably 5 to 500 µm, more preferably 20 to 250 µm, further preferably 30 to 180 µm, and most preferably 30 to 110 µm.

The phase retarder can be combined with a polarizing membrane to produce an elliptically polarizing plate. In addition, the phase retarder and the polarizing membrane can be installed in a liquid crystal display of transmission type, reflection type or semi-transmission type, to enlarge the viewing angle. The elliptically polarizing plate and the liquid crystal display equipped with the phase retarder are described below.

[Elliptically Polarizing Plate]

The phase retarder and a polarizing membrane are laminated to produce an elliptically polarizing plate. The elliptically polarizing plate comprising the phase retarder can enlarge the viewing angle of liquid crystal display. Examples of the polarizing membrane include an iodine polarizing membrane, a polyene polarizing membrane and a dichromatic dye polarizing membrane. The iodine polarizing membrane and the dye polarizing membrane are generally prepared from polyvinyl alcohol films. The polarizing membrane has a polarizing axis perpendicular to the stretching direction.

The polarizing membrane is laminated on the optically anisotropic layer-side of the phase retarder. A transparent protective film is preferably laminated on the polarizing membrane on the side opposite to the optical compensatory sheet. The transparent protective film preferably has a transmittance of 80% or more. The transparent protective film is made of generally cellulose ester, preferably triacetyl cellulose. The film of cellulose ester is preferably prepared according to the solvent-cast method. The transparent protective film preferably has a thickness of preferably 20 to 500 μm, more preferably 50 to 200 μm.

[Liquid Crystal Display]

The phase retarder enlarges the viewing angle of liquid crystal display. A liquid crystal display normally comprises a liquid crystal cell, a polarizing element and a phase retarder (optical compensatory sheet). The polarizing element generally comprises a polarizing membrane and a protective film. The polarizing membrane and the protective film may be the same as those described above for the elliptically polarizing plate. Japanese Patent Provisional Publication No. 6(1994)-214116, U.S. Pat. Nos. 5,583,679 and 5,646,703 and German Patent Publication No. 391160A1 disclose the phase retarder (optical compensatory sheet) for liquid crystal cell of TN mode. Japanese Patent Provisional Publication No. 10(1998)-54982 describes the optical compensatory sheet for liquid crystal cell of IPS or FLC mode. U.S. Pat. No. 5,805,253 and PCT Publication No. WO96/37804 show the optical compensatory sheet for liquid crystal cell of OCB or HAN mode. Japanese Patent Provisional Publication No. 9(1997)-26572 shows the optical compensatory sheet for liquid crystal cell of STN mode. Japanese Patent No. 2,866,372 describes the optical compensatory sheet for liquid crystal cell of VA mode.

In accordance with the above publications, the phase retarder (optical compensatory sheet) of the invention can be applied for liquid crystal displays of various modes. Examples of the modes include TN (twisted nematic) mode, IPS (in-plane switching) mode, FLC (ferroelectric liquid crystal) mode, OCB (optically compensatory bend) mode, STN (super twisted nematic) mode, VA (vertically aligned) mode and HAN (hybrid aligned nematic) mode.

EXAMPLE 1

(Preparation of Orientation Layer)

The denatured polyvinyl alcohol shown below and glutaric aldehyde (5 wt. % based on the denatured polyvinyl alcohol) were dissolved in a mixed solvent of methanol/water (ratio by volume: 20/80), to prepare a 5 wt. % coating solution for orientation layer.

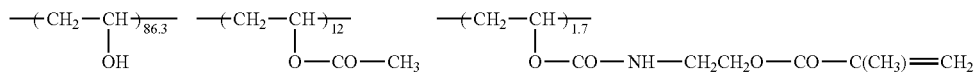

The prepared solution was then spread to coat a cellulose triacetate film (thickness: 80 μm, size: 270 mm×100 mm, TD80U, FUJI PHOTOFILM CO. LTD.), dried in hot flowing air at 100° C. for 120 seconds, and subjected to rubbing treatment, to form an orientation layer of 0.5 μm thickness.

(Formation of Optically Anisotropic Layer)

The rubbed surface of the orientation layer was coated with a dichloromethane solution of the compound (1) by means of a wire bar coater of #4. The thus-treated film was kept in a thermostat to align molecules of the compound, and immediately cooled to fix the alignment in glass state. Thus, an optically anisotropic layer of 1.9 μm thickness was formed.

EXAMPLE 2

The orientation layer prepared in the same manner as in Example 1 was coated with a dichloromethane solution of the compound (5) by means of a wire bar coater of #4. The thus-treated film was kept in a thermostat to align molecules of the compound, and immediately cooled to fix the alignment in glass state. Thus, an optically anisotropic layer of 2.0 μm thickness was formed.

COMPARISON EXAMPLE 1

(Formation of Optically Anisotropic Layer)

The orientation layer prepared in the same manner as in Example 1 was coated with a dichloromethane solution of the following compound (X) by means of a wire bar coater of #4. The thus-treated film was kept in a thermostat to align molecules of the compound, and immediately cooled to fix the alignment in glass state. Thus, an optically anisotropic layer of 2.3 μm thickness was formed.

The compound (X) corresponds to the compound TE-8(3) disclosed in Japanese Patent Provisional Publication No. 8(1996)-50206.

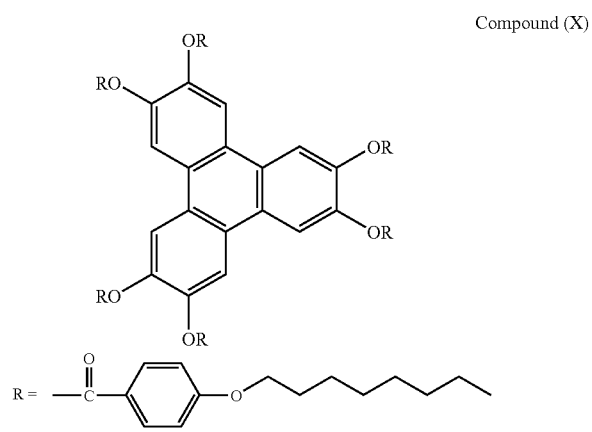

COMPARISON EXAMPLE 2

(Formation of Optically Anisotropic Layer)

The orientation layer prepared in the same manner as in Example 1 was coated with a dichloromethane solution of the following compound (Y) by means of a wire bar coater of #4. The thus-treated film was kept in a thermostat to align molecules of the compound, and immediately cooled to fix the alignment in glass state. Thus, an optically anisotropic layer of 1.9 μm thickness was formed.

The compound (Y) corresponds to the compound TE-8(6, m=7) disclosed in Japanese Patent Provisional Publication No. 8(1996)-50206.

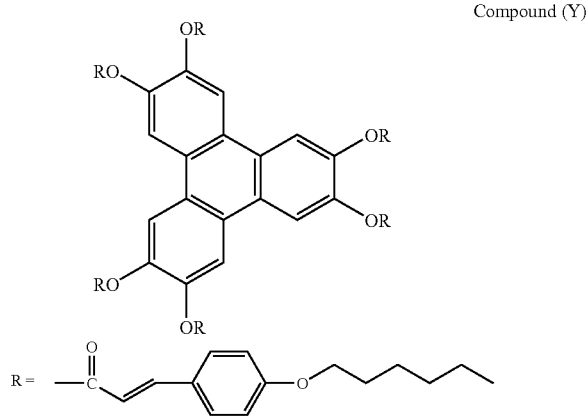

Compound (Y)

[Evaluation of Phase Retarder]

(Measurement of Δn)

The retardation of each optically anisotropic layer prepared above was measured at 632.8 nm by means of an ellipsometer (APE-100, Shimadzu Seisakusho Ltd.) in various viewing angles. From the obtained data, the value of Δn was calculated on the assumption of the refractive ellipsoid model according to "Designing Concepts of he Discotic Negative Compensation Films SID98 DIGEST". The results are shown in Table 1.

(Measurement of Wavelength Dispersion)

With respect to each optically anisotropic layer prepared above, the wavelength-dependence of retardation observed parallel to the normal of the film plane was measured by means of KOBRA21ADH (OJI SCIENTIFIC INSTRUMENTS CO., LTD.). The wavelength dispersion was expressed by the ratio of the retardation value at 478 nm per that at 747 nm. The results are shown in Table 1.

(Time for Aligning)

With respect to each optically anisotropic layer prepared above, how long it took for the liquid crystal molecules to orient themselves in mono-domain alignment without defect from starting to be heated was measured in a constant temperature. The molecules were observed with a polarizing microscope (OPTIPHOTO2, Nikon), to determine the time. The results are shown in Table 1.

(Production of liquid crystal display)

On a glass plate having an ITO electrode, an orientation layer of polyimide was provided and subjected to a rubbing treatment. This procedure was repeated to prepare two substrates, and the substrates were arranged face-to-face via a 5 μm spacer so that the orientation layers might be inside and so that the rubbing directions might be perpendicular to each other. Between them, a rod-like liquid crystal having Δn of 0.0969 (ZL4792, Merck & Co., Inc.) was introduced to prepare a liquid crystal cell of TN mode. The above-prepared phase retarder was laminated on each side of the liquid crystal cell so that the optically anisotropic layer might be on the side near the cell substrate. Further, on the outer face of each phase retarder, a polarizing plate was laminated to produce a liquid crystal display. In the thus-produced liquid crystal display, each phase retarder was placed so that the rubbing direction of orientation layer on the phase retarder might be anti-parallel to the rubbing direction of orientation layer on the neighboring cell substrate. Each polarizing plate was placed so that the absorption axis of the polarizing plate might be parallel to the rubbing direction of orientation layer on the near cell substrate.

Voltage was applied to the liquid crystal cell of the produced liquid crystal display. Transmittances were measured when white and black images were displayed at 2 V and 5 V, respectively. The ratio of them was regarded as the contrast ratio. The angle in which the thus determined contrast ratio was 10 without inversion of gradation was regarded as the viewing angle. In addition, when white and black images were displayed, angle-dependence of the chromaticity was observed with the eyes. The results are shown in Table 1.

TABLE 1

| Phase retarder | Δn | Thickness (μm) | Wavelength dispersion | Time for alignment (sec) | Viewing angle | | ΔC |
|---|---|---|---|---|---|---|---|
| | | | | | Up-down | Right-left | |
| Example 1 | 0.10 | 1.9 | 1.19 | 60 | 93° | 145° | A[1] |
| Example 2 | 0.10 | 2.0 | 1.19 | 60 | 93° | 145° | A[1] |
| Com. Ex. 1 | 0.08 | 2.3 | 1.22 | 65 | 92° | 145° | B[2] |
| Com. Ex. 2 | 0.11 | 1.9 | 1.26 | 65 | 92° | 145° | C[3] |

Remark (ΔC)
A[1]: Chromaticity change is scarcely observed.
B[2]: Chromaticity change is observed a little.
C[3]: Chromaticity change is observed.

Although giving a higher Δn than Comparison Example 1, Comparison Example 2 gave such a large wavelength dispersion that the chromaticity changed more unfavorably. In contrast, Examples 1 and 2 were superior to Comparison Example 1 in both Δn and wavelength dispersion. Examples 1 and 2 gave enough high Δn to make the layers thin and accordingly to shorten the time for aligning. Further, the wavelength dispersion in Examples 1 and 2 was small enough to prevent a displayed image from changing the chromaticity.

We claim:

1. An optically anisotropic element comprising a discotic compound represented by the following formula (I), wherein the discotic compound has an oriented discotic plane:

$$D(-O-CO-CR^1=CR^2-X-R^3)_n \quad (I)$$

in which D is a discotic core; n is an integer of 3 to 20; each of $R^1$ and $R^2$ is independently hydrogen or methyl; X is —O—, —S— or —NR—where R is hydrogen or an alkyl group; and $R^3$ is an alkyl group, a substituted alkyl group, an aryl group or a substituted aryl group.

2. The optically anisotropic element as defined in claim 1, wherein D in the formula (I) is triphenylene.

3. The optically anisotropic element as defined in claim 1, wherein n in the formula (I) is 6.

4. The optically anisotropic element as defined in claim 1, wherein X in the formula (I) is —O— or —S—.

5. The optically anisotropic element as defined in claim 1, wherein $R^3$ in the formula (I) is a substituted alkyl group or a substituted aryl group, and has a substituent group in which a polymerizable group is positioned at the terminal.

6. The optically anisotropic element as defined in claim 1, wherein the discotic compound represented by the formula (I) is a discotic liquid crystal.

7. The optically anisotropic element as defined in claim 1, wherein the discotic compound forms a discotic nematic phase.

8. An optically anisotropic element formed by polymerizing a polymerizable discotic compound represented by the following formula (II), wherein the discotic compound has an oriented discotic plane, alignment of said oriented discotic plane being fixed by polymerization:

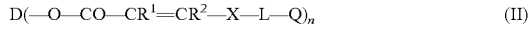  (II)

in which D is a discotic core; n is an integer of 3 to 20; each of $R^1$ and $R^2$ is independently hydrogen or methyl; X is —O—, —S— or —NR— where R is hydrogen or an alkyl group; L is an alkylene group, a substituted alkylene group, an arylene group, a substituted arylene group or a divalent linking group consisting of a combination of an alkylene group, a substituted alkylene group, an arylene group or a substituted arylene group with —S— or —CO—; and Q is a polymerizable group.

9. The optically anisotropic element as defined in claim 8, wherein D in the formula (II) is triphenylene.

10. The optically anisotropic element as defined in claim 8, wherein n in the formula (II) is 6.

11. The optically anisotropic element as defined in claim 8, wherein X in the formula (II) is —O— or —S—.

12. The optically anisotropic element as defined in claim 8, wherein Q in the formula (II) is an epoxy group or an ethylenically unsaturated group.

13. The optically anisotropic element as defined in claim 8, wherein the discotic compound represented by the formula (I) is a discotic liquid crystal.

14. The optically anisotropic element as defined in claim 8, wherein the discotic compound forms a discotic nematic phase.

15. A discotic compound represented by the following formula (I):

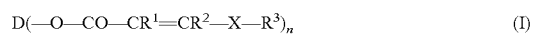  (I)

in which D is a discotic core; n is an integer of 3 to 20; each of $R^1$ and $R^2$ is independently hydrogen or methyl; X is —O—, —S— or —NR— where R is hydrogen or an alkyl group; and $R^3$ is an alkyl group, a substituted alkyl group, an aryl group or a substituted aryl group.

16. The discotic compound as defined in claim 15, wherein D in the formula (I) is triphenylene.

17. The discotic compound as defined in claim 15, which is a discotic liquid crystal.

* * * * *